United States Patent
Ichihara et al.

(10) Patent No.: US 10,254,639 B2
(45) Date of Patent: Apr. 9, 2019

(54) TRANSPARENT SCREEN FOR 3D DISPLAY AND 3D DISPLAY SYSTEM

(71) Applicant: FUJIFILM Corporation, Tokyo (JP)

(72) Inventors: Nobuhiko Ichihara, Minami-ashigara (JP); Yujiro Yanai, Minami-ashigara (JP); Akira Yamamoto, Minami-ashigara (JP); Michio Nagai, Minami-ashigara (JP); Daisuke Kashiwagi, Minami-ashigara (JP); Yukito Saitoh, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/841,606

(22) Filed: Dec. 14, 2017

(65) Prior Publication Data

US 2018/0107106 A1 Apr. 19, 2018

Related U.S. Application Data

(63) Continuation of application No. PCT/JP2016/067245, filed on Jun. 9, 2016.

(30) Foreign Application Priority Data

Jun. 15, 2015 (JP) .................................. 2015-120393

(51) Int. Cl.
*G03B 21/604* (2014.01)
*G02B 5/26* (2006.01)
(Continued)

(52) U.S. Cl.
CPC ............. *G03B 21/604* (2013.01); *G02B 5/09* (2013.01); *G02B 5/10* (2013.01); *G02B 5/201* (2013.01);
(Continued)

(58) Field of Classification Search
CPC ........... G02F 1/13338; G02F 2201/343; G03B 21/604; G03B 21/60; G03B 21/56;
(Continued)

(56) References Cited

U.S. PATENT DOCUMENTS

| 4,995,718 A | 2/1991 | Jachimowicz et al. |
| 8,367,189 B2 * | 2/2013 | Sekine ................ G02B 5/3016 428/211.1 |

(Continued)

FOREIGN PATENT DOCUMENTS

| CN | 107250910 A | 10/2017 |
| JP | 3-211992 A | 9/1991 |

(Continued)

OTHER PUBLICATIONS

International Preliminary Report on Patentability and Written Opinion of the International Searching Authority (Forms PCT/IB/326, PCT/IB/373 and PCT/ISA/237) for International Application No. PCT/JP2016/067245, dated Dec. 28, 2017, with English translation.
(Continued)

*Primary Examiner* — Bao-Luan Q Le
(74) *Attorney, Agent, or Firm* — Birch, Stewart, Kolasch & Birch, LLP

(57) ABSTRACT

A transparent screen for 3D display having excellent transparency and an excellent viewing angle, and a 3D display system are provided. The transparent screen for 3D display has a plurality of dots, each of the dots having wavelength selectivity and being formed of a liquid crystal material having a cholesteric structure, in which the cholesteric structure gives a striped pattern of bright parts and dark parts in a cross-sectional view of the dot observed by a scanning electron microscope, the dot includes a portion having a height that increases continuously to the maximum height in a direction extending from the edge toward the center of the
(Continued)

dot, in the portion, the angle formed by the normal line to a line that is formed by a first dark part as counted from the surface of the dot on the opposite side of the substrate and the surface of the dot is in the range of 70° to 90°, and right-handed circularly polarized light and left-handed circularly polarized light are reflected by the plurality of dots.

9 Claims, 8 Drawing Sheets

(51) Int. Cl.
| | |
|---|---|
| G03B 35/26 | (2006.01) |
| G02B 5/09 | (2006.01) |
| G02B 5/24 | (2006.01) |
| G02F 1/1335 | (2006.01) |
| G03B 21/608 | (2014.01) |
| G02B 5/10 | (2006.01) |
| G02B 5/20 | (2006.01) |
| G02B 5/30 | (2006.01) |
| G02B 27/26 | (2006.01) |
| G03B 21/62 | (2014.01) |

(52) U.S. Cl.
CPC ............... *G02B 5/24* (2013.01); *G02B 5/26* (2013.01); *G02B 5/3016* (2013.01); *G02B 27/26* (2013.01); *G02F 1/133528* (2013.01); *G03B 21/608* (2013.01); *G03B 21/62* (2013.01); *G03B 35/26* (2013.01); *G02F 2001/133541* (2013.01)

(58) Field of Classification Search
CPC .............. G03B 21/62; G03B 21/608; B32B 2037/243; B32B 2307/416; B32B 2310/08; B32B 2310/0831; B32B 38/145; G02B 5/3025
See application file for complete search history.

(56) References Cited

U.S. PATENT DOCUMENTS

| | | | | |
|---|---|---|---|---|
| 8,466,408 | B2* | 6/2013 | Miyazaki | G02B 5/3025 235/115 |
| 8,993,100 | B2* | 3/2015 | Sekine | B32B 38/145 428/195.1 |
| 9,213,929 | B2* | 12/2015 | Tazaki | G06K 19/06037 |
| 2006/0181769 | A1 | 8/2006 | Kumasawa et al. | |
| 2007/0290047 | A1* | 12/2007 | Tazaki | G06K 19/06037 235/491 |
| 2008/0182041 | A1* | 7/2008 | Sekine | G02B 5/3016 428/29 |
| 2008/0233360 | A1* | 9/2008 | Sekine | B32B 38/145 428/195.1 |
| 2009/0015548 | A1* | 1/2009 | Tazaki | G06F 3/0308 345/156 |
| 2009/0059158 | A1 | 3/2009 | Umeya et al. | |
| 2009/0279170 | A1* | 11/2009 | Miyazaki | G02B 5/3025 359/485.01 |
| 2013/0265550 | A1* | 10/2013 | Park | G02B 27/26 353/8 |
| 2017/0336555 | A1 | 11/2017 | Yanai et al. | |
| 2017/0343830 | A1 | 11/2017 | Nagai et al. | |

FOREIGN PATENT DOCUMENTS

| | | | |
|---|---|---|---|
| JP | 3-269526 | A | 12/1991 |
| JP | 2006-227581 | A | 8/2006 |
| JP | 2006-337944 | A | 12/2006 |
| JP | 2007-219258 | A | 8/2007 |
| JP | 2008-65022 | A | 3/2008 |
| JP | 2008-250541 | A | 10/2008 |
| JP | 2008-269545 | A | 11/2008 |
| JP | 2009-8932 | A | 1/2009 |
| JP | 2010-85532 | A | 4/2010 |
| JP | 2014-71250 | A | 4/2014 |
| JP | 2014071250 | A * | 4/2014 |
| WO | WO 2007/105721 | A1 | 9/2007 |
| WO | WO 2016-129645 | A1 | 8/2016 |
| WO | WO 2016-133223 | A1 | 8/2016 |

OTHER PUBLICATIONS

International Search Report (Form PCT/ISA/210) for International Application No. PCT/JP2016/067245, dated Aug. 23, 2016, with English translation.

Japanese Office Action, dated Jul. 31, 2018, for Japanese Application No. 2017-525190, with an English machine translation.

* cited by examiner

TRANSPARENT SCREEN FOR 3D DISPLAY AND 3D DISPLAY SYSTEM

CROSS-REFERENCE TO RELATED APPLICATIONS

This application is a Continuation of PCT International Application No. PCT/JP2016/067245 filed on Jun. 9, 2016, which claims priority under 35 U.S.C. § 119(a) to Japanese Patent Application No. 2015-120393 filed on Jun. 15, 2015. The above application is hereby expressly incorporated by reference, in its entirety, into the present application.

BACKGROUND OF THE INVENTION

1. Field of the Invention

The present invention relates to a transparent screen for 3D display and a 3D display system.

2. Description of the Related Art

In recent years, in order to enhance a realistic sensation of an image displayed by an image display apparatus, the development of an apparatus for displaying a three-dimensional (3D) image with a stereoscopic feeling is underway.

In particular, for movies or amusement, an apparatus for displaying a 3D image with a realistic sensation highly enhanced due to 3D display with a large screen is provided.

As such a 3D image display apparatus, an image display system including a projecting device such as a projector and a screen is generally used, and a time-sharing system (liquid crystal shutter system) which is an active type, and a linear polarization system, a circular polarization system, an anaglyph system, and a wavelength division system which are a passive type are used as major systems. Among these, the passive type circular polarization system is widely used in a movie theater or the like because a weight of 3D glasses can be reduced, less flickering occurs, and brightness is not changed even in a case of inclining a face.

In the circular polarization system, irradiation is performed while an image for a right eye and an image for a left eye from a projecting device are alternatingly being switched. At the same time, two kinds of circularly polarizing plates (or λ/4 plates) are switched in accordance with the images, and the irradiated light is right-handed circularly polarized or left-handed circularly polarized and is projected on a screen.

As the screen, a screen which reflects projected video light without disturbing the circular polarization is used. Therefore, right-handed circularly polarized light and left-handed circularly polarized light of the video light reflected on the screen are respectively incident onto a right eye and a left eye of a viewer through 3D glasses, each of right and left eyes sees only a designated frame, and thus a video image is three-dimensionally viewed.

In order to express augmented reality, it is proposed that the screen is made transparent, video images such as a moving image and a still image are superimposed on a background of the screen, and the superimposed image is displayed, and is also proposed that a stereoscopic video image is projected as a video image.

For example, JP2007-219258A describes that a projection screen includes a first transparent screen which diffuses and reflects light having one polarized component, in light including one polarized component and the other polarized component, and transmits the other light, and a second screen which is provided on the back surface side of the first transparent screen and diffuses and reflects the light transmitted through the first transparent screen, in which the first transparent screen and the second screen are disposed to be spaced from each other. It is also described that by using the second screen having transparency, the whole projection screen becomes transparent, and by combining the stereoscopic video image projected on the projection screen and the background, excellent realistic sensation is achieved.

Moreover, JP2007-219258A describes that light is selectively reflected on a polarized-light selective reflection layer formed of a liquid crystalline composition showing cholesteric regularity.

SUMMARY OF THE INVENTION

Generally, reflective type screens can be classified into a diffusion type, a recursion type, and a mirror reflection type, depending on the reflection characteristics.

A diffusion type screen uniformly diffuses and reflects light that has hit the surface into all directions without deflection. Therefore, the overall brightness is not so high; however, the viewing angle can be made wider.

A recursion type screen reflects light in a direction in which the light has been projected. Therefore, the brightness obtainable when viewed from the vicinity of a light source can be made high.

A mirror reflection type screen reflects light such that the incident angle of light is equal to the reflected angle, in the same manner as in the case of light being reflected by a mirror. Therefore, the brightness obtainable when viewed at the position of a reflected angle with respect to the incident angle of light from a light source, can be made high.

Such a recursion type or mirror reflection type screen can have the brightness increased in a particular direction; however, since the brightness in other directions is lowered, the screen has a feature that the viewing angle is narrowed.

Here, in regard to a transparent screen that reflects light from the front surface side and transmits light from the back surface side, it is requested to enhance the performance of transmitting light from the back surface, in addition to an enhancement in the reflection performance such as an increase in the brightness of projected light or an increase in the viewing angle.

In addition, in regard to the screen for 3D display, in order to three-dimensionally view a video image, it is necessary to increase the brightness of the reflected light to a certain degree. Therefore, in order to view a stereoscopic video image even in a case where a viewer views the screen from any direction, it is required to increase the brightness of the reflected light at a wide viewing angle.

However, in a case where diffusibility is increased in the transparent screen for 3D display using a flat layer-shaped reflection layer as described in JP2007-219258A in order to widen the viewing angle, there is a problem that the haze value increases, while transparency is lowered. On the contrary, in a case where transparency is increased, since the diffusibility is decreased, there is a problem that the viewing angle is narrowed.

In view of such circumstances, it is an object of the invention to provide a transparent screen for 3D display having excellent transparency and an excellent viewing angle, and a 3D display system.

The inventors of the invention conducted a thorough investigation on the problems of the prior art technologies, and as a result, the inventors found that the problems can be solved by providing a transparent screen for 3D display having a plurality of dots, each of the dots having wavelength selectivity and being formed of a liquid crystal material having a cholesteric structure, in which the cholesteric structure gives a striped pattern of bright parts and dark parts in a cross-sectional view of the dot observed by a scanning electron microscope, the dot includes a portion having a height that increases continuously to the maximum height in a direction extending from the edge toward the center of the dot, in the portion, the angle formed by the normal line to a line that is formed by a first dark part as counted from the surface of the dot on the opposite side of the substrate and the surface of the dot is in the range of 70° to 90°, and right-handed circularly polarized light and left-handed circularly polarized light are reflected by the plurality of dots.

That is, the inventors found that the above-described object can be achieved by the following configurations.

(1) A transparent screen for 3D display comprising: a plurality of dots, each of the dots having wavelength selectivity and being formed of a liquid crystal material having a cholesteric structure, wherein the cholesteric structure gives a striped pattern of bright parts and dark parts in a cross-sectional view of the dot observed by a scanning electron microscope, the dot includes a portion having a height that increases continuously to the maximum height in a direction extending from the edge toward the center of the dot, in the portion, the angle formed by the normal line to a line that is formed by a first dark part as counted from the surface of the dot and the surface of the dot is in the range of 70° to 90°, and right-handed circularly polarized light and left-handed circularly polarized light are reflected by the plurality of dots.

(2) The transparent screen for 3D display according to (1), wherein the plurality of dots include dots that reflect right-handed circularly polarized light and dots that reflect left-handed circularly polarized light.

(3) The transparent screen for 3D display according to (1) or (2), further comprising a transparent substrate having the plurality of dots formed on the surface thereof.

(4) The transparent screen for 3D display according to (3), wherein the dot that reflects the right-handed circularly polarized light and the dot that reflects the left-handed circularly polarized light are formed on one surface of the transparent substrate.

(5) The transparent screen for 3D display according to (3), wherein the dot that reflects the right-handed circularly polarized light is formed on one surface of the transparent substrate and the dot that reflects the left-handed circularly polarized light is formed on the other surface of the transparent substrate.

(6) The transparent screen for 3D display according to (3), wherein a first transparent substrate having the dot that reflects the right-handed circularly polarized light formed thereon and a second transparent substrate having the dot that reflects the left-handed circularly polarized light formed thereon are provided, and the first transparent substrate having the dot that reflects the right-handed circularly polarized light formed thereon and the second substrate having the dot that reflects the left-handed circularly polarized light formed thereon are laminated.

(7) The transparent screen for 3D display according to any one of (1) to (6), which includes dots each having, in a single dot, a region that reflects the right-handed circularly polarized light and a region that reflects the left-handed circularly polarized light.

(8) The transparent screen for 3D display according to any one of (1) to (7), wherein the plurality of dots include two or more kinds of dots that reflect light in wavelength regions different from each other.

(9) The transparent screen for 3D display according to any one of (1) to (8), wherein a diameter of the dot is 5 to 250 μm.

(10) The transparent screen for 3D display according to any one of (1) to (9), wherein a distance between dots adjacent to each other is equal to or larger than the diameter of the dot and equal to or smaller than 850 μm.

(11) The transparent screen for 3D display according to any one of (1) to (10), wherein the liquid crystal material is a material obtainable by curing a liquid crystal composition including a liquid crystal compound, a chiral agent, and a surfactant.

(12) A 3D display system comprising: the transparent screen for 3D display according to any one of (1) to (11); a projecting device that projects a video image on the transparent screen for 3D display by using the right-handed circularly polarized light and the left-handed circularly polarized light; and glasses including a right-handed polarizing filter that transmits the right-handed circularly polarized light and does not transmit the left-handed circularly polarized light, and a left-handed polarizing filter that transmits the left-handed circularly polarized light and does not transmit the right-handed circularly polarized light.

According to the invention, a transparent screen for 3D display having excellent transparency and an excellent viewing angle, and a 3D display system can be provided.

DESCRIPTION OF THE PREFERRED EMBODIMENTS

Figure 1A:
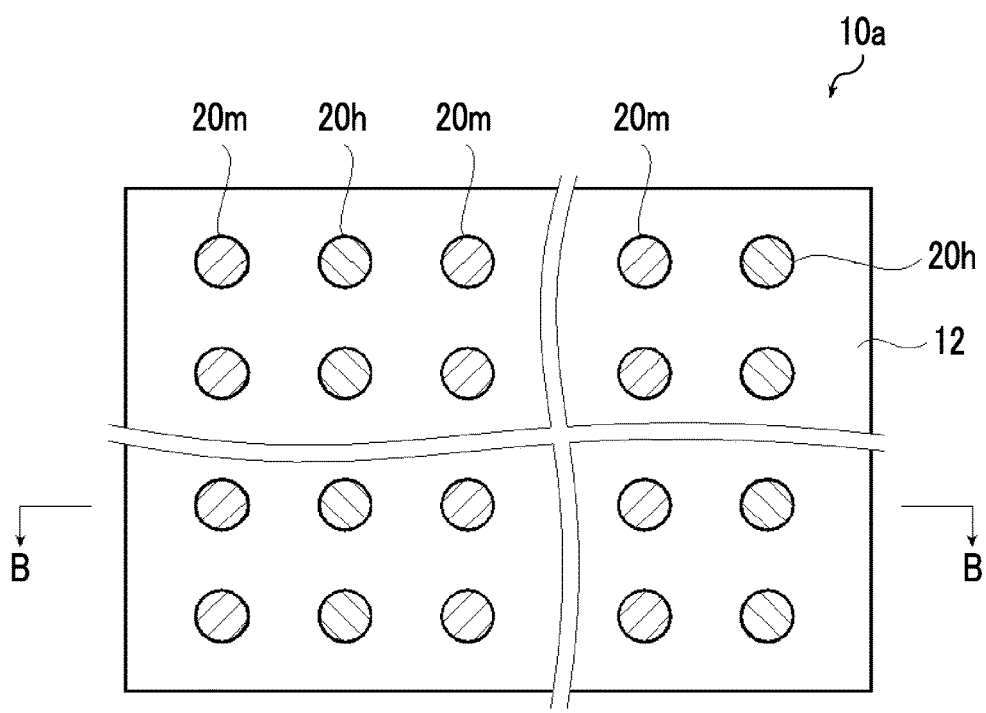
FIG. 1A is a front view conceptually illustrating an example of a transparent screen for 3D display of the invention.

The transparent screen for 3D display and the 3D display system of the invention will be explained in detail below. A numerical value range represented by using "to" in the present specification means a range including the numerical values described before and after "to" as the lower limit and the upper limit, respectively.

According to the present specification, for example, an angle such as "45°", "parallel", "perpendicular" or "orthogonal" means that unless particularly stated otherwise, the difference between the angle and the exact angle is in the range of smaller than 5 degrees. The difference between the angle and the exact angle is preferably smaller than 4 degrees, and more preferably smaller than 3 degrees.

According to the present specification, the term "(meth)acrylate" is used to mean "any one or both of acrylate and methacrylate".

According to the present specification, the term "same" is meant to include an error range that is generally tolerable in the technical field. According to the present specification, in a case where it is said "entirety", "all" or "entire surface", the terms are meant to include error ranges that are generally tolerable in the technical field, in addition to the case of being 100%, and to include the cases of, for example, 99% or more, 95% or more, or 90% or more.

Visible light is light having wavelengths that can be seen by human eyes among the electromagnetic waves and indicates light in the wavelength region of 380 nm to 780 nm. Non-visible light is light in the wavelength region of shorter than 380 nm or in the wavelength region of longer than 780 nm.

Without being limited to this, light in the wavelength region of 420 nm to 495 nm in the visible light is blue light, light in the wavelength region of 495 nm to 570 nm is green light, and light in the wavelength region of 620 nm to 750 nm is red light.

In the infrared light, near-infrared light is an electromagnetic wave in the wavelength region of 780 nm to 2,500 nm. Ultraviolet light is light in the wavelength region of 10 to 380 nm.

Recursive reflection according to the present specification means reflection by which incident light is reflected in the direction of incidence.

According to the present specification, the term "haze" means a value measured using a haze meter, NDH-2000, manufactured by Nippon Denshoku Industries Co., Ltd.

Theoretically, the haze means a value represented by the following expression.

(Diffuse transmittance of natural light at 380 to 780 nm)/(diffuse transmittance of natural light at 380 to 780 nm+direct transmittance of natural light)×100%

The diffuse transmittance is a value that can be calculated by subtracting the direct transmittance from the omnidirectional transmittance obtainable by using a spectrophotometer and an integrating sphere unit. The direct transmittance in the case based on the value measured using an integrating sphere unit is transmittance at 0°.

The transparent screen for 3D display of the invention is a transparent screen for 3D display having a plurality of dots, each of the dots having wavelength selectivity and being formed of a liquid crystal material having a cholesteric structure, in which the cholesteric structure gives a striped pattern of bright parts and dark parts in a cross-sectional view of the dot observed by a scanning electron microscope, the dot includes a portion having a height that increases continuously to the maximum height in a direction extending from the edge toward the center of the dot, in the portion, the angle formed by the normal line to a line that is formed by a first dark part as counted from the surface of the dot on the opposite side of the substrate and the surface of the dot is in the range of 70° to 90°, and right-handed circularly polarized light and left-handed circularly polarized light are reflected by the plurality of dots.

As described above, for a transparent screen for 3D display which reflects light from the front surface side and transmits light from the back surface side, it is requested to enhance the performance of transmitting light from the back surface, in addition to an enhancement in the reflection performance such as an increase in the brightness of projected light or an increase in diffusibility.

In addition, in regard to the screen for 3D display, in order to three-dimensionally view a video image, it is necessary to increase the brightness of the reflected light to a certain degree. Therefore, in order to view a stereoscopic video image even in a case where a viewer views the screen from any direction, it is required to increase the brightness of the reflected light at a wide viewing angle.

However, in regard to a transparent screen for 3D display, in a case where a portion selectively reflecting light is formed into a flat layer shape, and diffusibility is increased in order to widen the viewing angle, there is a problem that the haze value increases, and transparency is lowered. In contrast, in a case where transparency is increased, since the diffusibility is decreased, there is a problem that the viewing angle is narrowed.

In this regard, according to the invention, in a transparent screen which is capable of reflecting video light that is emitted from a video device such as a projector and enters the front surface, and transmitting light from the back surface, so that the video light and the background on the back surface side can be observed in a superimposed manner, by reflecting light in a particular wavelength region and transmitting light in other wavelength regions by using a liquid crystal material having a cholesteric structure, a liquid crystal material having a cholesteric structure is formed into a plurality of dot-like bodies, the 3D display is performed by reflecting right-handed circularly polarized light and left-handed circularly polarized light by the plurality of dots, this cholesteric structure of the dots give a striped pattern of bright parts and dark parts in a cross-sectional view of a dot observed by scanning electron microscope and includes a portion having a height that increases continuously to the maximum height in a direction extending from the edge toward the center of the dot, and in the portion, the angle formed by the normal line to a line that is formed by the first dark part as counted from the surface of the dot on the opposite side of the substrate and the surface of the dot is in the range of 70° to 90°. Therefore, light can be reflected in any direction in addition to mirror reflection, and the viewing angle can be widened without lowering transparency.

<Transparent Screen for 3D Display>

Suitable embodiments of the transparent screen for 3D display (hereinafter, also referred to as a transparent screen) of the invention will be explained below with reference to the drawings. FIG. 1A illustrates a front view of an example of the transparent screen of the invention, and FIG. 1B illustrates a cross-sectional view of FIG. 1A cut along the line B-B.

The drawings presented for the invention are schematic views, and the relations of the thicknesses of various layers, the positional relations, and the like do not necessarily coincide with the actual relations. The same also applies to the following drawings.

Figure 1B:
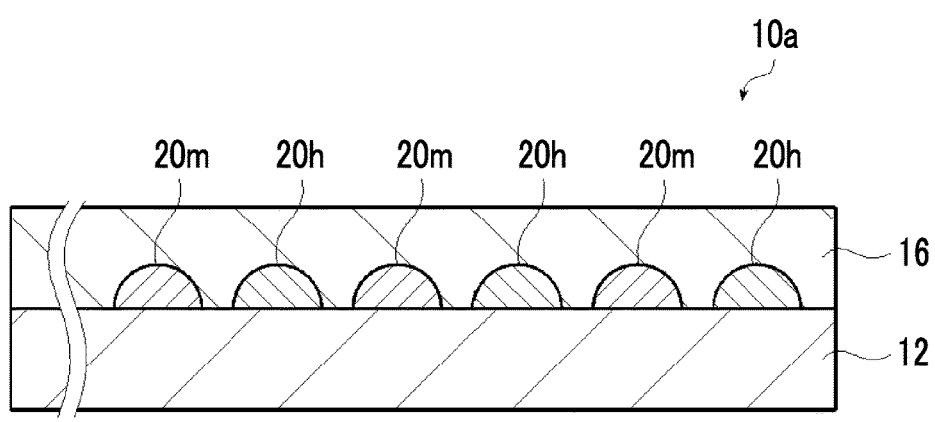
FIG. 1B is a cross-sectional view of FIG. 1A cut along the line B-B.

As illustrated in FIG. 1A and FIG. 1B, a transparent screen 10a has a substrate 12 capable of transmitting light; a plurality of right-handed polarizing dots 20m and a plurality of left-handed polarizing dots 20h formed on one principal surface of the substrate 12; and an overcoat layer 16 formed on the surface on the side where the right-handed polarizing dots 20m and the left-handed polarizing dots 20h are formed, so as to embed the right-handed polarizing dots 20m and the left-handed polarizing dots 20h.

In FIG. 1A, the overcoat layer 16 is not shown in the drawing.

In FIG. 1A, in order to distinguish between the right-handed polarizing dot 20m and the left-handed polarizing dot 20h, these dots are shown by adding hatchings different from each other.

The right-handed polarizing dot 20m is a dot that reflects the right-handed circularly polarized light and the left-handed polarizing dot 20h is a dot that reflects the left-handed circularly polarized light.

The reflected light of the cholesteric structure of the liquid crystal material that constitutes the dots is circularly polarized light. That is, the cholesteric structure of the liquid crystal material selectively reflects one of right-handed circularly polarized light or left-handed circularly polarized light, and transmits the other. The circularly polarized light-selective reflectivity concerning whether the reflected light of a cholesteric structure is right-handed circularly polarized light or left-handed circularly polarized light, depends on the direction of twist of the spiral of the cholesteric structure. Selective reflection by a cholesteric liquid crystal occurs such that in a case in which the direction of twist of the spiral of the cholesteric liquid crystal is right-handed, right-handed circularly polarized light is reflected, and in a case in which the direction of twist of the spiral is left-handed, left-handed circularly polarized light is reflected.

Therefore, the right-handed polarizing dot 20m is a dot in which the direction of twist of the spiral of the cholesteric liquid crystal is right-handed, and the left-handed polarizing dot 20h is a dot in which the direction of twist of the spiral of the cholesteric liquid crystal is left-handed.

As illustrated in FIG. 1A, the right-handed polarizing dot 20m and the left-handed polarizing dot 20h are arranged alternatingly on the substrate 12 in a horizontal direction in the drawing, and the same kinds of dots are arranged in a row in the vertical direction in the drawing.

Since the right-handed polarizing dot 20m that reflects the right-handed circularly polarized light and the left-handed polarizing dot 20h that reflects the left-handed circularly polarized light are provided, irradiation is performed while an image for a right eye and an image for a left eye from a projecting device are alternatingly being switched, the right-handed circularly polarized light and the left-handed circularly polarized light can be reflected. Therefore, since a viewer views the video image projected on the transparent screen through 3D glasses, each of right and left eyes sees only a designated frame, and thus a video image is three-dimensionally viewed.

The right-handed polarizing dot 20m and the left-handed polarizing dot 20h have the same configuration, except that directions of polarization of reflected light are different, and thus in the following description, in a case where it is not necessary to distinguish between the right-handed polarizing dot 20m and the left-handed polarizing dot 20h, these dots are collectively explained as dots 20.

Video light enters through the surface on the side where the dots 20 are formed. That is, the surface on the side where the dots 20 are formed is a front surface, and the surface on the opposite side is a back surface.

As described above, since the dots 20 are formed of a liquid crystal material having a cholesteric structure having wavelength-selective reflectivity, the video light that enters through the surface of the transparent screen 10a on the side where the plurality of dots 20 are formed is reflected at the surface of a dot 20. However, since a dot 20 is formed into an approximately hemispheric shape, the incident angle of the incident video light changes correspondingly to the various positions on the surface of the dot 20. Accordingly, the video light is reflected in various directions, and an effect that the viewing angle is widened can be manifested.

By forming a portion reflecting light into a dot shape, a reflection area ratio in a surface of the substrate is decreased, and it is possible to increase transparency of the background for suitably transmitting light.

Based on the wavelength region of the incident video light, the dots 20 have wavelength-selective reflectivity of selectively reflecting light in this wavelength region.

The cholesteric structure of the liquid crystal material that constitutes the dots 20 gives a striped pattern of bright parts and dark parts in a cross-sectional view of a dot observed by a scanning electron microscope and includes a portion having a height that increases continuously to the maximum height in a direction extending from the edge toward the center of the dot, and in the portion, the angle formed by the normal line to a line that is formed by a first dark part as counted from the surface of the dot on the opposite side of the substrate and the surface of the dot is in the range of 70° to 90°.

More detailed explanation in this regard will be given later.

In regard to the transparent screen 10a illustrated in FIG. 1A, arrangement patterns of the right-handed polarizing dot 20m and the left-handed polarizing dot 20h adopt the pattern in which these dots are arranged alternatingly on the substrate 12 in a horizontal direction in the drawing, and the same kinds of dots are arranged in a row in the vertical direction in the drawing. However, the invention is not limited to this, and the dots may be arranged alternatingly or may be arranged randomly in the horizontal direction and the vertical direction.

The array densities (the number of dots per unit area) of the right-handed polarizing dot 20m and the left-handed polarizing dot 20h may be identical with or different from each other, and from the viewpoint of suitably performing 3D display, it is preferable that the array densities of dots are the same.

In addition, in regard to the transparent screen 10a illustrated in FIG. 1B, a preferred aspect thereof has an overcoat layer 16 that is formed so as to cover the dots 20. However, the invention is not intended to be limited to this, and a configuration in which the dots 20 are exposed without having the overcoat layer is also acceptable.

According to the invention, in a case where the transparent screen has an overcoat layer 16 as in the case of the transparent screen 10a illustrated in FIG. 1B, it is preferable from the viewpoint that transparency can be improved by eliminating surface unevenness caused by the plurality of dots 20 and flattening a surface.

Furthermore, in the case of forming the overcoat layer 16, from the viewpoint of further enhancing transparency by suppressing reflection at the interface between the overcoat layer 16 and the dots 20, it is preferable as the difference between the refractive index of the overcoat layer 16 and the refractive index of the dots 20 is smaller. The difference in the refractive index is preferably 0.10 or less and more preferably 0.04 or less.

Figure 2:
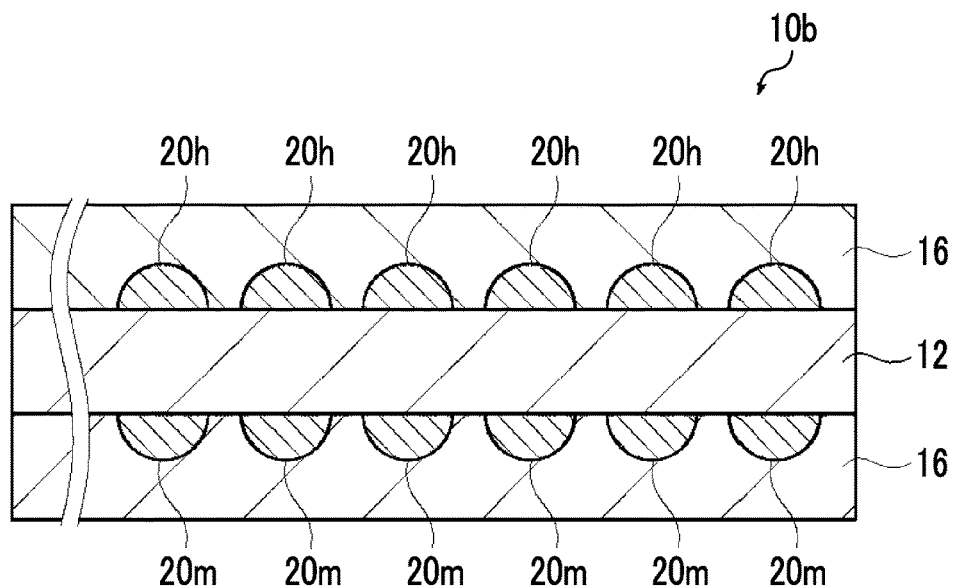
FIG. 2 is a schematic cross-sectional view of another example of the transparent screen for 3D display of the invention.

The transparent screen 10a illustrated in FIG. 1B is configured such that the right-handed polarizing dot 20m and the left-handed polarizing dot 20h are formed on one principal surface of the substrate 12; however, the invention is not limited to this, and as in the case of a transparent screen 10b illustrated in FIG. 2, the transparent screen 10a may also be configured such that the plurality of the right-handed polarizing dots 20m are formed on one principal surface of the substrate 12 and the plurality of the left-handed polarizing dots 20h are formed on the other principal surface of the substrate 12.

The arrangement pattern of the right-handed polarizing dot 20m and the arrangement pattern of the left-handed polarizing dot 20h may be identical with or different from each other.

Without being limited to the configuration in which the plurality of the right-handed polarizing dots and the left-handed polarizing dots are respectively formed on the different principal surfaces of the substrate, a configuration in which the plurality of the right-handed polarizing dots and the left-handed polarizing dots are formed on one principal surface of the substrate 12 and the plurality of the right-handed polarizing dots and the left-handed polarizing dots are also formed on the other principal surface of the substrate 12 is also acceptable.

The dot arrangement pattern on one principal surface of the substrate and the dot arrangement pattern on the other principal surface may be identical with or different from each other.

Figure 3:
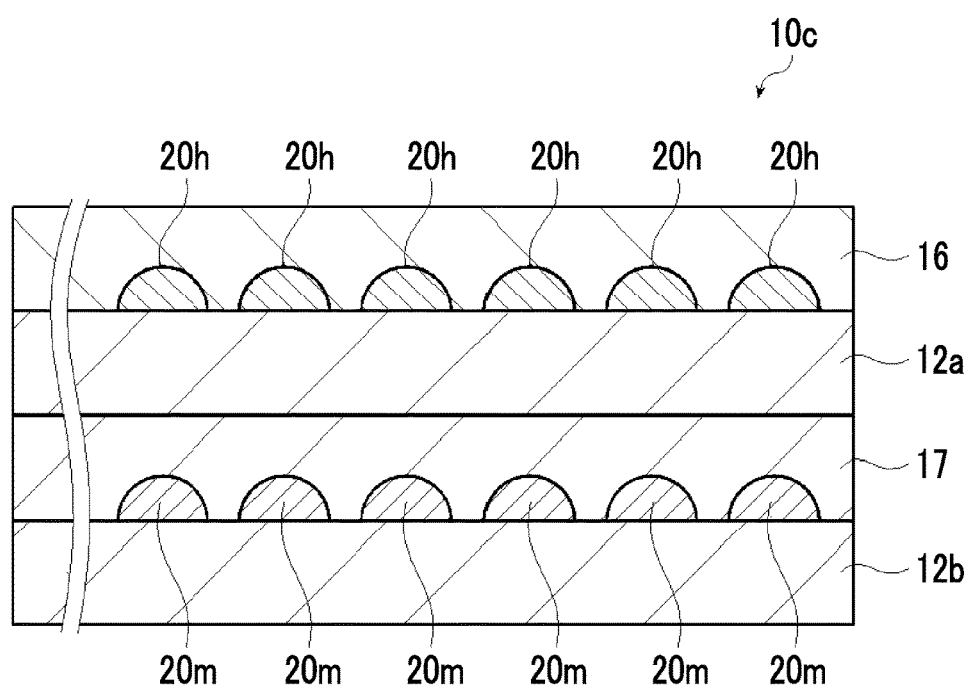
FIG. 3 is a schematic cross-sectional view of another example of the transparent screen for 3D display of the invention.

The transparent screen 10a illustrated in FIG. 1B is configured such that the right-handed polarizing dot 20m and the left-handed polarizing dot 20h are formed on one substrate 12; however, the invention is not limited to this, and as in the case of a transparent screen 10c illustrated in FIG. 3, the transparent screen 10a may also be configured to have two substrate, and configured such that the plurality of the left-handed polarizing dots 20h are formed on a first substrate 12a, the plurality of the right-handed polarizing dots 20m are formed on a second substrate 12b, and the first substrate 12a and the second substrate 12b are laminated via an adhesive layer 17.

The example illustrated in the drawing is configured such that the adhesive layer 17 is formed over the entire surface of the first substrate 12a and the second substrate 12b, and these substrates are laminated; however, the invention is not limited to this, and the example may also be configured such that the adhesive layer 17 is formed only at edges of the first substrate 12a and the second substrate 12b, these substrates are laminated, and an air layer is formed between the first substrate 12a and the second substrate 12b.

In FIG. 3, a surface of the first substrate 12a on a side where the left-handed polarizing dots 20h is not formed and a surface of the second substrate 12b on a side where the right-handed polarizing dots 20m are formed are laminated so as to face each other; however, the invention is not limited to this, and a surface of the first substrate 12a on a side where the left-handed polarizing dots 20h are formed and a surface of the second substrate 12b on a side where the right-handed polarizing dots 20m is not formed may be laminated so as to face each other, a surface of the first substrate 12a on a side where the left-handed polarizing dots 20h are formed and a surface of the second substrate 12b on a side where the right-handed polarizing dots 20m are formed may be laminated so as to face each other, or a surface of the first substrate 12a on a side where the left-handed polarizing dots 20h is not formed and a surface of the second substrate 12b on a side where the right-handed polarizing dots 20m is not formed may be laminated so as to face each other.

In the example illustrated in FIG. 3, the left-handed polarizing dots 20h are formed on the first substrate 12a and the right-handed polarizing dots 20m are formed on the second substrate 12b; however, the invention is not limited to this, and a configuration in which the left-handed polarizing dots 20h and the right-handed polarizing dots 20m are formed on the first substrate 12a and the right-handed polarizing dots 20m and the left-handed polarizing dots 20h are formed on the second substrate 12b is also acceptable.

In the configuration having two substrates, by adopting a configuration in which dots that reflect light with one polarization direction are formed on one substrate and dots that reflect light with the other polarization direction are formed on the other substrate, the transparent screen can also be used as a transparent screen of a so-called depth-fused 3-D (DFD) system in which a depth feeling is recognized due to the superimposition of video images projected on surfaces of the two substrates and the distance in a thickness direction. In a case of being used as the DFD system, the surfaces of the two substrates need to be disposed to be spaced from each other, and a separation distance is preferably 3 mm to 1,000 mm, more preferably 5 mm to 600 mm, and particularly preferably 10 mm to 100 mm.

In the example illustrated in FIG. 3, dots are formed on one principal surface of each of the first substrate 12a and the second substrate 12b; however, the invention is not limited to this, and a configuration in which dots are formed on both surfaces of each of the first substrate 12a and the second substrate 12b is also acceptable.

The first substrate 12a and the second substrate 12b may be formed of the same material or may be formed of the different materials. Moreover, the thickness of the first substrate 12a and the thickness of the second substrate 12b may be identical with or different from each other.

In the example illustrated in FIG. 1A, with a configuration in which a single dot reflects light with one polarization direction among the right-handed circularly polarized light and the left-handed circularly polarized light, the right-handed polarizing dots 20m that reflect the right-handed circularly polarized light and the left-handed polarizing dots 20h that reflect the left-handed circularly polarized light are provided and the right-handed circularly polarized light and the left-handed circularly polarized light are reflected; however, the invention is not limited to this, and with a configuration in which a single dot reflects the right-handed circularly polarized light and the left-handed circularly polarized light, the right-handed circularly polarized light and the left-handed circularly polarized light may be reflected.

Figure 4:
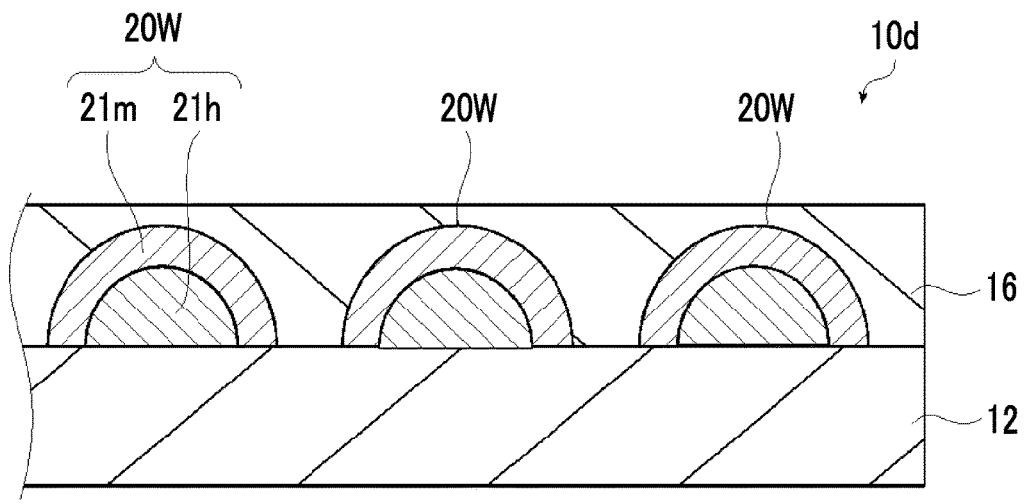
FIG. 4 is a schematic cross-sectional view of another example of the transparent screen for 3D display of the invention.

For example, a transparent screen 10d illustrated in FIG. 4 is configured to include, as a plurality of dots, a plurality of two-layered dots 20W having a right-handed polarizing region 21m that reflects right-handed circularly polarized light and a left-handed polarizing region 21h that reflects left-handed circularly polarized light in a single dot.

Specifically, the two-layered dot 20W has a configuration in which two layers, namely, a left-handed polarizing region 21h formed in a hemispheric shape on the substrate 12 side; and a right-handed polarizing region 21m laminated on the surface of the left-handed polarizing region 21h, are laminated in the direction of the normal line to the substrate 12.

Such a two-layered dot 20W has a layer that reflects right-handed circularly polarized light and a layer that reflects left-handed circularly polarized light, and therefore, the two-layered dot 20T can reflect right-handed circularly polarized light and left-handed circularly polarized light of incident video light with a single dot.

In the example illustrated in FIG. 4, the two-layered dot 20W is configured to have a left-handed polarizing region 21h and a right-handed polarizing region 21m laminated in this order from the substrate 12 side; however, the invention is not intended to be limited to this, and the two-layered dot 20W may also be configured to have a right-handed polarizing region 21m and a left-handed polarizing region 21h laminated in this order.

The plurality of dots 20 thus formed may be such that all of the dots 20 reflect light in the same wavelength region as long as the dots include dots that reflect light with different polarization directions; however, the invention is not intended to be limited to this, and a configuration including two or more kinds of dots that reflect light in wavelength regions different from each other is also acceptable.

Figure 5:
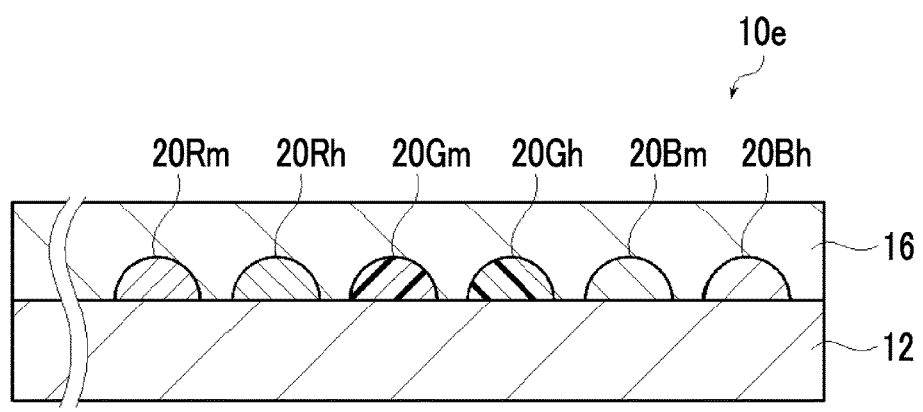
FIG. 5 is a schematic cross-sectional view of another example of the transparent screen for 3D display of the invention.

For example, a transparent screen 10e illustrated in FIG. 5 is configured to include, as a plurality of dots, right-handed polarizing red dots 20Rm that reflect red light in the wavelength region of 610 nm to 690 nm and right-handed circularly polarized light; left-handed polarizing red dots 20Rh that reflect red light and left-handed circularly polarized light; right-handed polarizing green dots 20Gm that reflect green light in the wavelength region of 515 nm to 585 nm and right-handed circularly polarized light; left-handed polarizing green dots 20Gh that reflect green light and left-handed circularly polarized light; right-handed polarizing blue dots 20Bm that reflect blue light in the wavelength region of 420 nm to 480 nm and right-handed circularly polarized light; and left-handed polarizing blue dots 20Bh that reflect blue light and left-handed circularly polarized light.

As such, the transparent screen may be configured to have two or more kinds of dots that reflect light in wavelength regions different from each other, and to have dots that reflect right-handed circularly polarized light and dots that reflect left-handed circularly polarized light as the dots that reflect light in various wavelength regions. Therefore, it is possible to display the video image projected on the transparent screen as a color image.

The example illustrated in FIG. 5 is configured to include dots that reflect the right-handed circularly polarized light and/or the left-handed circularly polarized light of each of red light, green light, and blue light; however, the invention is not intended to be limited to this, and the transparent screen may also include dots that reflect light in other wavelength regions.

It is desirable that the dots that reflect the right-handed circularly polarized light and/or the left-handed circularly polarized light of each of red light, green light, and blue light are dots reflecting light in the above-mentioned wavelength regions, and it is also acceptable that the peak wavelength of the reflected waves may not be included in the range of the wavelength regions described above.

The invention is not limited to a configuration including dots that reflect the right-handed circularly polarized light and/or the left-handed circularly polarized light of each of red light, green light, and blue light, and for example, a configuration including dots that reflect the right-handed circularly polarized light and/or the left-handed circularly polarized light of red light and dots that reflect the right-handed circularly polarized light and/or the left-handed circularly polarized light of blue light may be employed, or a configuration including the dots that reflect the right-handed circularly polarized light and/or the left-handed circularly polarized light of each of red light, green light, and blue light, as well as dots that reflect the right-handed circularly polarized light and/or the left-handed circularly polarized light of light in another wavelength region may also be employed.

Moreover, the example illustrated in FIG. 5 is configured to have dots that reflect right-handed circularly polarized light and dots that reflect left-handed circularly polarized light respectively for the two or more kinds of dots that reflect light in wavelength regions different from each other; however, the invention is not limited to this, and the transparent screen may also be configured, for at least one kind among the dots that reflect light in wavelength regions different from each other, to include dots that reflect right-handed circularly polarized light and dots that reflect left-handed circularly polarized light, and for the rest, may be configured to include dots reflecting light that is circularly polarized in any one direction.

the example illustrated in FIG. 5 is configured to have dots that reflect the right-handed circularly polarized light and dots that reflect the left-handed circularly polarized light, in various wavelength regions; however, the invention is not limited to this, and a configuration in which the right-handed circularly polarized light and the left-handed circularly polarized light are reflected by a single dot, in various wavelength regions.

For example, a configuration in which a red dot having a region that reflects right-handed circularly polarized light and a region that reflects left-handed circularly polarized light for red light, a green dot having a region that reflects right-handed circularly polarized light and a region that reflects left-handed circularly polarized light for green light, and a blue dot having a region that reflects right-handed circularly polarized light and a region that reflects left-handed circularly polarized light for blue light may also be employed.

Here, in a case in which the transparent screen has dots that reflect the right-handed circularly polarized light and/or the left-handed circularly polarized light of light in wavelength regions different from each other, there are no particular limitations on the arrangement of the dots, and for example, the dots may be arranged alternatingly, or may be arranged randomly.

For example, in the case where the transparent screen has a total of six dots of dots that reflect right-handed circularly polarized light and dots that reflect left-handed circularly polarized light, for each of the red light, the green light, and the blue light, dots for each color that reflect light with the same polarization direction are arranged in sequence in each row in the vertical direction in the drawing, and dots with the different polarization directions are arranged alternatingly in the horizontal direction in the drawing.

Figure 6A:
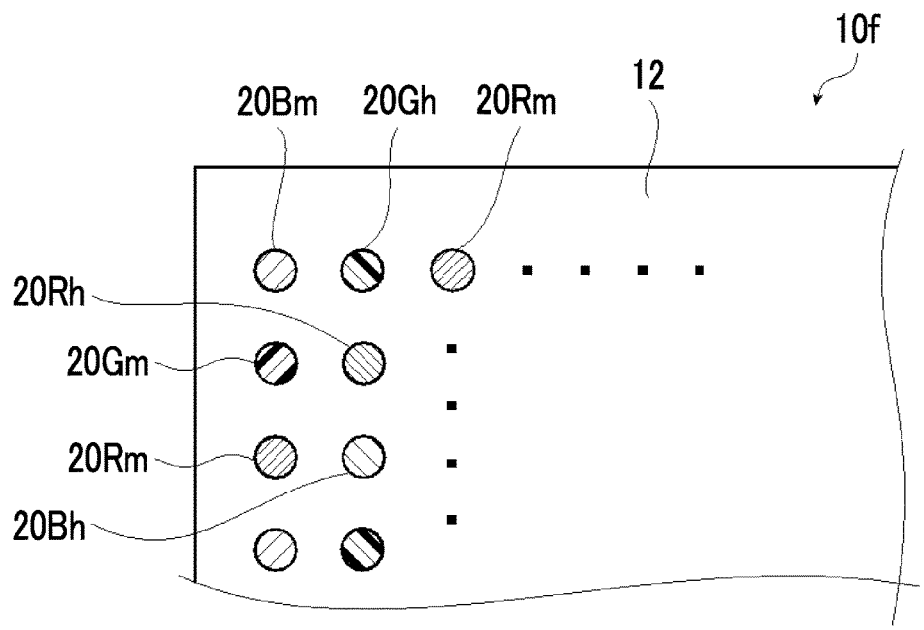
FIG. 6A is schematic front view illustrating an example of the dot arrangement pattern in the transparent screen for 3D display illustrated in FIG. 5.

Specifically, as in the case of a transparent screen 10f illustrated in FIG. 6A, in a first row, the right-handed polarizing blue dot 20Bm, the right-handed polarizing green dot 20Gm, and the right-handed polarizing red dots 20Rm are arranged in this order, in a second row, the left-handed polarizing green dot 20Gh, the left-handed polarizing red dot 20Rh, and the left-handed polarizing blue dots 20Bh are arranged in this order, in a third row, the right-handed polarizing red dots 20Rm, the right-handed polarizing blue dot 20Bm, and the right-handed polarizing green dot 20Gm are arranged in this order, and even in a fourth row and so forth, dots may be arranged in the same manner.

Figure 6B:
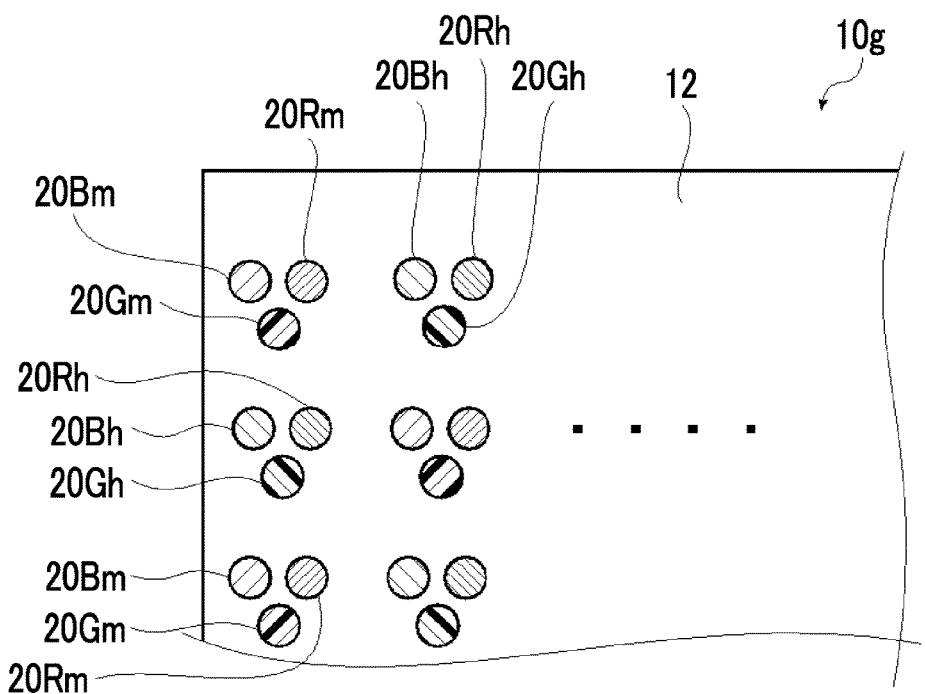
FIG. 6B is schematic front view illustrating another example of the dot arrangement pattern in the transparent screen for 3D display illustrated in FIG. 5.

Alternatively, as in the case of a transparent screen 10g illustrated in FIG. 6B, a combination in which one right-handed polarizing blue dot 20Bm, one right-handed polarizing green dot 20Gm, and one right-handed polarizing red dots 20Rm are disposed such that the interval between one another is equal is designated as one set, a combination in which one left-handed polarizing blue dots 20Bh, one left-handed polarizing green dot 20Gh, and one left-handed polarizing red dot 20Rh are disposed such that the interval between one another is equal is designated as one set, and the transparent screen may be configured by arranging a plurality of the set of dots the reflect the right-handed circularly polarized light and the set of dots that reflect left-handed circularly polarized light in the vertical direction and the horizontal direction in the drawing.

Furthermore, the various dots may also be configured such that a single dot reflects light in a plurality of wavelength regions, and reflects right-handed circularly polarized light and left-handed circularly polarized light of each of the wavelength regions. That is, the various dots may be configured to include dots each having regions that reflect light in wavelength regions different from each other in a single dot, and having a region that reflects right-handed circularly polarized light and a region that reflects left-handed circularly polarized light for each wavelength region.

Figure 7:
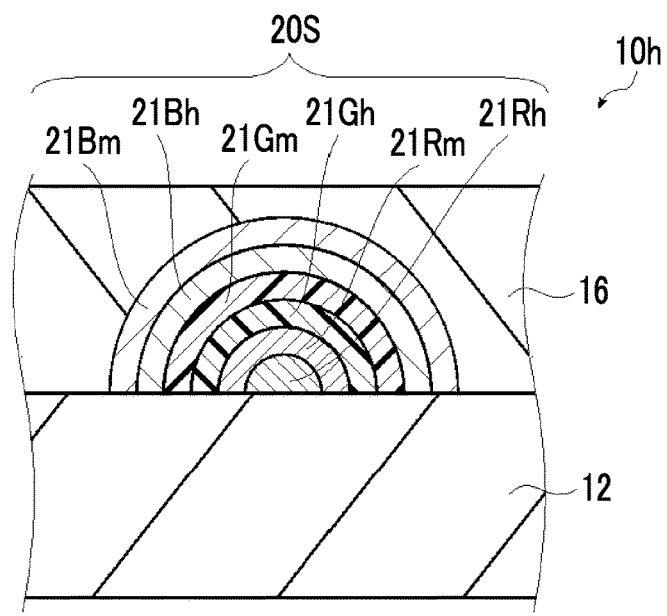
FIG. 7 is a schematic cross-sectional view of another example of the transparent screen of the invention.

FIG. 7 illustrates a schematic cross-sectional view of another example of the transparent screen of the invention.

A transparent screen 10h illustrated in FIG. 7 is configured to include, as a plurality of dots, a plurality of six-layered dots 20S having a left-handed polarizing red region 21Rh that reflects red light and left-handed circularly polarized light; a right-handed polarizing red region 21Rm that reflects red light and right-handed circularly polarized light; a left-handed polarizing green region 21Gh that reflects green light and left-handed circularly polarized light; a right-handed polarizing green region 21Gm that reflects green light and right-handed circularly polarized light; a left-handed polarizing blue region 21Bh that reflects blue light and left-handed circularly polarized light; and a right-handed polarizing blue region 21Bm that reflects blue light and right-handed circularly polarized light, in a single dot.

Specifically, the six-layered dot 20S is configured to have six layers such as a left-handed polarizing red region 21Rh formed in a hemispheric shape on the substrate 12 side; a right-handed polarizing red region 21Rm laminated on the surface of the left-handed polarizing red region 21Rh; a left-handed polarizing green region 21Gh laminated on the surface of the right-handed polarizing red region 21Rm; a right-handed polarizing green region 21Gm laminated on the surface of the left-handed polarizing green region 21Gh; a left-handed polarizing blue region 21Bh laminated on the surface of the right-handed polarizing green region 21Gm; and a right-handed polarizing blue region 21Bm laminated on the surface of the left-handed polarizing blue region 21Bh, laminated in the direction of the normal line to the substrate 12.

Since such a six-layered dot 20S has a layer reflecting right-handed circularly polarized light and a layer reflecting left-handed circularly polarized light for red light; a layer reflecting right-handed circularly polarized light and a layer reflecting left-handed circularly polarized light for green light; and a layer reflecting right-handed circularly polarized light and a layer reflecting left-handed circularly polarized light for blue light, the six-layered dot 20S can reflect right-handed circularly polarized light and left-handed circularly polarized light of red light, green light, and blue light of incident video light with a single dot.

Next, the materials, shape, and the like of the various constituent elements of the transparent screen of the invention will be described in detail.

[Substrate]

The substrate that is included in the transparent screen of the invention functions as a base material for forming dots on the surface.

It is preferable that the substrate has a low reflectance for light at the wavelength at which the dots reflect light, and it is preferable that the substrate does not include a material that reflects light at the wavelength at which the dots reflect light.

It is also preferable that the substrate is transparent for the visible light region. The substrate may be colored; however, it is preferable that the substrate is not colored or is colored to a low extent. Furthermore, it is preferable that the substrate has a refractive index of about 1.2 to 2.0, and more preferably about 1.4 to 1.8.

In a case where it is said in the present specification that an object is transparent, specifically, the non-polarized light transmittance (omnidirectional transmittance) at a wavelength of 380 to 780 nm may be 50% or higher, is preferably 70% or higher, and is more preferably 85% or higher.

The haze value of the substrate is preferably 30% or lower, more preferably 0.1% to 25%, and particularly preferably 0.1% to 10%.

The thickness of the substrate may be selected according to the applications and is not particularly limited. The thickness may be about 5 μm to 1,000 μm, and is preferably 10 μm to 250 μM, and more preferably 15 μm to 150 μm.

The substrate may be single-layered or may be multilayered, and examples of the substrate in the case of being a single layer substrate include substrates formed of glass, triacetyl cellulose (TAC), polyethylene terephthalate (PET), polycarbonate, polyvinyl chloride, acryl, and a polyolefin. As an example of the substrate in the case of being a multilayered substrate, a substrate that has any one of the examples of the substrate in the case of being a single-layered substrate, as a support, and is provided with another layer on the surface of the support, may be mentioned.

Figure 8:
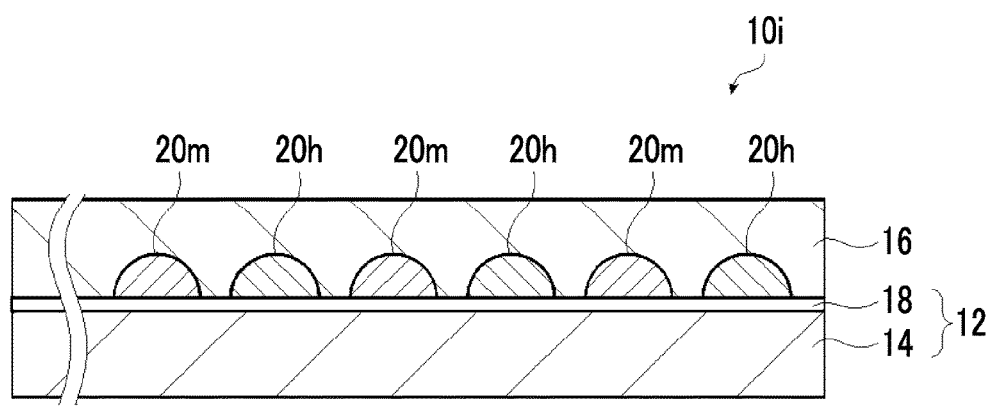
FIG. 8 is a schematic cross-sectional view of another example of the transparent screen of the invention.

For example, an underlayer 18 may be provided between the support 14 and the dots 20, similarly to the transparent screen 10i illustrated in FIG. 8. The underlayer is preferably a resin layer, and is particularly preferably a transparent resin layer. Examples of the underlayer include a layer for adjusting the surface shape at the time of forming dots, a layer for improving the adhesive characteristics to the dots, and an oriented layer for adjusting the orientation of a polymerizable liquid crystal compound at the time of forming dots.

Regarding the underlayer, it is preferable that the underlayer has a low light reflectance at a wavelength at which the dots reflect light, and it is preferable that the underlayer does not include a material that reflects light at the wavelength at which the dots reflect light. It is also preferable that the underlayer is transparent. Regarding the underlayer, the refractive index is preferably about 1.2 to 2.0, and more preferably about 1.4 to 1.8. It is also preferable that the underlayer is formed of a thermosetting resin or a photo-curable resin, which is obtained by curing a composition that is directly applied on the support surface and includes a polymerizable compound. Examples of the polymerizable compound include non-liquid crystal compounds such as a (meth)acrylate monomer and a urethane monomer.

The thickness of the underlayer is not particularly limited, and the thickness is preferably 0.01 to 50 µm, and more preferably 0.05 to 20 µm.

[Dots]

The transparent screen of the invention includes the plurality of dots formed on the substrate surface. As described above, regarding the substrate surface where dots are formed, the dots may be formed on both surfaces of a substrate, or may be formed on any one surface.

It is desirable that two or more dots are formed on the substrate surface. Two or more dots are formed close to each other on the substrate surface, and a plurality of such dot groups are formed. At that time, as described above, the plurality of dots may be arranged regularly in a predetermined pattern, or may be randomly disposed. The dots may be uniformly arranged over the entire surface of the substrate, or may be arranged at least in a partial region of the substrate only.

Here, the array density of the dots is not particularly limited, and may be appropriately set according to the diffusibility (viewing angle), transparency, and the like required for the transparent screen.

From the viewpoint that a balance can be achieved between a wide viewing angle and high transparency, and from the viewpoint of an appropriate density at which dots can be produced without any defects such as coalescence or deletion of dots at the time of production, the area ratio of the dots with respect to the substrate as viewed in the direction of the normal line to a principal surface of the substrate is preferably 1.0% to 90.6%, more preferably 2.0% to 50.0%, and particularly preferably 4.0% to 30.0%.

In regard to the area ratio of the dots, the area ratio in a region having a size of 1 mm×1 mm was measured in an image obtainable with a microscope such as a laser microscope, a scanning electron microscope (SEM) or a transmission electron microscope (TEM), and the average value at 5 sites was designated as the area ratio of the dots.

Similarly, from the viewpoint that a balance can be achieved between a wide viewing angle and high transparency, the pitch between adjacent dots is preferably equal to or larger than the diameter of the dot and equal to or smaller than 850 µm, more preferably 30 to 300 µm, and particularly preferably 50 to 150 µm.

Furthermore, from the viewpoint described above, adjacent dots may contact with each other and are preferably spaced from each other, and a ratio of dots that do not contact with other dots (non-contact ratio of dots) in all of the dots is preferably 10% or higher, more preferably 80% or higher, and particularly preferably 90% or higher.

In a case in which there are a plurality of dots on the substrate surface, the diameter and shape of the dots may be all identical, or dots having different diameters and shapes may be included; however, it is preferable that the diameter and shape are all identical. For example, dots formed under the same conditions under the intention of forming dots having the same diameter and the same shape, are preferred.

According to the present specification, in a case where the dots are explained, the explanation is applicable to all the dots in the transparent screen of the invention; however, it is acceptable that the transparent screen of the invention that includes the dots thus explained includes dots that do not apply to the conditions of the same explanation due to deviations or errors that are tolerable in the present technical field.

(Shape of Dots)

The dots may be circular when viewed in the direction of the normal line to a principal surface of the substrate (hereinafter, also referred to as substrate normal line direction). The circular shape may not be a perfect circle, and an approximately circular shape is still acceptable. In a case where the term center is used for a dot, this means the center of this circular shape or the center of gravity. In a case in which there are a plurality of dots on the substrate surface, it is desirable that the average shape of the dots is circular, and some dots having a shape that is not considered circular may be included.

The dots are such that the diameter as viewed in the substrate normal line direction is preferably 5 to 250 µm, more preferably 10 to 200 µm, and particularly preferably 20 to 120 µm.

The diameter of a dot can be obtained by using an image obtainable with a microscope such as a laser microscope, a scanning electron microscope (SEM) or a transmission electron microscope (TEM), and measuring the length of a straight line that extends from an edge (border or boundary line of a dot) to another edge and passes through the center of the dot. The number of dots and the distance between dots can also be checked from a microscopic image obtained with a laser microscope, a scanning electron microscope (SEM), or a transmission electron microscope (TEM).

In a case in which the shape of the dot is other than a circular shape when viewed in the substrate normal line direction, the diameter of a circle having the same circle area as the projected area of this dot (equivalent circle diameter) is designated as the diameter of the dot.

The dot includes a portion having a height that increases continuously to the maximum height in a direction extending from the edge toward the center of the dot. That is, the dot includes an inclined portion or a curved surface portion having a height increasing from the edge toward the center of the dot. According to the present specification, the above-described portion may be referred to as an inclined portion or a curved surface portion. The inclined portion or curved surface portion represents a portion that is surrounded by a portion of the dot surface extending from a point that starts to increase continuously to a point representing the maximum height, on the dot surface in a cross-sectional view that is perpendicular to the principal surface of the substrate; a straight line that links those points with the substrate by the minimum distance; and the substrate.

According to the present specification, in a case where the term "height" is used for the dot, this means "the minimum distance from a dot on the surface of the dot on the opposite side of the substrate, to the surface of the substrate on the side where the dot is formed". At this time, the surface of the dot may be an interface with another layer. In a case in which the substrate has surface unevenness, an extension of the substrate surface at the edge of the dot is regarded as the surface on the side where the dot is formed. The maximum height is the maximum value of the height as described above, and for example, the maximum height is the minimum distance from the apex of the dot to the surface of the substrate on the side where the dot is formed. The height of a dot can be checked from a cross-sectional view of the dot that is obtained by focal point scanning by means of a laser microscope, or by using a microscope such as SEM or TEM.

The inclined portion or curved surface portion may be at the edge in the direction of a section as viewed from the center of the dot, or may be at the entirety. For example, in a case where the dot is circular in shape, the edge corresponds to the circumference; however, the edge may be the edge in the direction of a section of the circumference (for example, a part corresponding to a length of 30% or more, 50% or more, 70% or more, and 90% or less of the circumference), or the edge may be an edge in the direction of the entirety of the circumference (90% or more, 95% or more, or 99% or more of the circumference). It is preferable that the edge of a dot is at the entirety. That is, it is preferable that the change in the height in the direction extending from the center of the dot toward the circumference is identical in all directions. Furthermore, it is preferable that the optical properties such as recursive reflectivity described below and the properties explained in a cross-sectional view are also identical in all directions extending from the center toward the circumference.

The inclined portion or curved surface portion may exist at a certain distance that starts from the edge of the dot (border or boundary line of the circumference) but does not reach the center; may extend from the edge of the dot to the center; may exist at a certain distance that starts from a portion at a certain distance from the border (boundary line) of the circumference of the dot but does not reach the center; or may extend from a portion at a certain distance from the edge of the dot, to the center.

A structure that includes the above-described inclined portion or curved surface portion may be, for example, a hemispherical shape having a flat face on the substrate side, a shape that has been flattened by cutting the top of this hemispherical shape approximately in parallel to the substrate (truncated sphere shape), a conical shape having a face on the substrate side as the bottom face, or a shape that has been flattened by cutting the top of this conical shape approximately in parallel to the substrate (truncated cone shape). Among these, preferred shapes include a hemispherical shape having a flat face on the substrate side, a shape that has been flattened by cutting the top of this hemispherical shape approximately in parallel to the substrate, and a shape that has been flattened by cutting the top of a conical shape, which has a face on the substrate side as the bottom face, approximately in parallel to the substrate. The hemispherical shape is meant to include a hemispherical shape having a face including the center of the sphere as a flat face, as well as any of a spherical segment shape obtainable by arbitrarily cutting a sphere into two (preferably a spherical segment shape that does not include the center of the sphere).

The point on the dot surface that gives the maximum height of the dot may be the apex of a hemispherical shape or a conical shape, or may be on the face that has been flattened by cutting approximately in parallel to the substrate as described above. It is also preferable that all of the dots on the flattened face give the maximum height of the dot. It is also preferable that the center of the dot gives the maximum height.

The angle (for example, an average value) formed by the surface of a dot on the opposite side of the substrate and the substrate (surface of the substrate on the side where the dot is formed), that is, the contact angle between the substrate and the dot is preferably 40° or larger, and more preferably 60° or larger. In a case where the contact angle is adjusted to be in this range, a balance between a wide viewing angle and high transparency can be achieved.

The angle can be checked from a cross-sectional view of the dot that is obtained by focal point scanning by means of a laser microscope, or by using a microscope such as SEM or TEM; however, according to the present specification, the angle of the contacting part between the substrate and the dot surface as measured from a cross-sectional view of SEM image at a surface that includes the center of the dot and is perpendicular to the substrate, is employed.

As described above, the contact angle between the substrate and the dot can be adjusted to a desired range by providing an underlayer between the substrate and the dot.

(Optical Properties of Dots)

The dots have wavelength-selective reflectivity. The light for which the dots exhibit selective reflectivity is not particularly limited, and for example, the light may be any of infrared light, visible light, ultraviolet light, and the like. For example, in a case in which the transparent screen is used as a screen that displays an image created by video light emitted from a video device such as projector, and the background on the back surface side of the transparent screen in a superimposed manner, it is preferable that the light for which the dots exhibit selective reflectivity is visible light.

Alternatively, it is also preferable that the reflection wavelength is selected according to the wavelength of light that is emitted from the light source used in combination.

The dots are formed of a liquid crystal material having a cholesteric structure. The wavelength of the light for which the dots exhibit selective reflectivity can be carried out by adjusting the spiral pitch in the cholesteric structure of the liquid crystal material that forms the dots as described above. In the liquid crystal material that forms the dots for the transparent screen of the invention, since the direction of the spiral axis of the cholesteric structure is controlled as will be described below, the incident light is reflected by specular reflection as well as in various directions.

The dots may be colored; however, it is preferable that the dots are not colored, or the dots are colored to a low extent. Thereby, transparency of the transparent screen can be enhanced.

(Cholesteric Structure)

A cholesteric structure is known to exhibit selective reflectivity for a particular wavelength. The center wavelength $\lambda$ of selective reflection depends on the pitch P of the spiral structure (=period of spiral) in the cholesteric structure, and follows the relation of the average refractive index n of the cholesteric liquid crystal and $\lambda = n \times P$. Therefore, the selective reflection wavelength can be regulated by regulating this pitch of the spiral structure. Since the pitch of the cholesteric structure depends on the type of the chiral agent used together with a polymerizable liquid crystal compound at the time of forming the dots, or the concentration of addition of the chiral agent, a desired pitch can be obtained by adjusting these. In regard to the adjustment of the pitch, a detailed description is given in Fuji Film Research & Development, No. 50 (2005), pp. 60 to 63. In regard to the method for measuring the sense or pitch of a spiral, the methods described in "Ekisho Kagaku Jikken Nyumon (Introduction to Experiments in Liquid Crystal Chemistry)", edited by Japanese Liquid Crystal Society, published by Sigma Shuppan K.K., 2007, p. 46; and "Ekisho Benran (Handbook of Liquid Crystals)", Editorial Committee for the Handbook of Liquid Crystals, Maruzen, Inc., p. 196, can be used.

A cholesteric structure gives a striped pattern of bright parts and dark parts in a cross-sectional view of the dot as observed by a scanning electron microscope (SEM). Two repeated sets of the bright part and the dark part (two bright parts and two dark parts) correspond to one pitch of the spiral. From this, the pitch can be measured from a SEM cross-sectional view. The normal lines to the various lines of the striped pattern become the direction of the spiral axis.

The half-width Δλ (nm) of the selective reflection zone (circularly polarized light reflection zone) that exhibits selective reflection is such that Δλ depends on the birefringence Δn and the pitch P of the liquid crystal compound, and follows the relation of Δλ=Δn×P. Therefore, control of the width of the selective reflection zone can be carried out by adjusting Δn. The adjustment of Δn can be carried out by adjusting the type of the polymerizable liquid crystal compound or the mixing ratio thereof, or by controlling the temperature at the time of orientation immobilization. The half-width of the reflection wavelength zone is adjusted according to the applications of the transparent screen of the invention, and for example, the half-width is desirably 50 to 500 nm, and preferably 100 to 300 nm.

(Cholesteric Structure in Dot)

Figure 11:
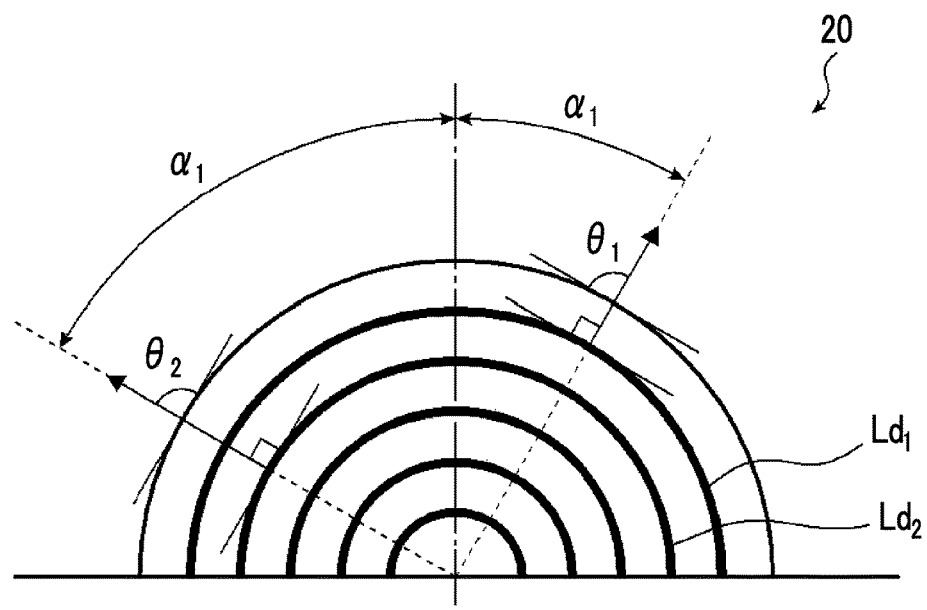
FIG. 11 is a view conceptually illustrating an example of a cross-section of a dot.

Regarding the dot, in a case where the above-mentioned inclined portion or curved surface portion is checked from a cross-sectional view observed by a scanning electron microscope (SEM), the angle (hereinafter, also referred to as an angle of a dark line) formed by the normal line to a line that is formed by a first dark part as counted from the surface of the dot on the opposite side of the substrate and the aforementioned surface is in the range of 70° to 90°. FIG. 11 illustrates a schematic view of a cross-section of the dot. In this FIG. 11, the line formed by a dark part is represented by a bold line. As illustrated in FIG. 11, the angle $\theta_1$ formed by the normal line to line $Ld_1$ that is formed by the first dark part and the surface of the dot is 70° to 90°. Here, in a case where the position at the dot surface in the inclined portion or the curved surface portion is represented by angle $\alpha_1$ with respect to a line perpendicular to the substrate surface that passes through the center of the dot, with the angle $\alpha_1$ being at the position of 30° and at the position of 60°, it is desirable that the angle formed by the direction of the normal line to line $Ld_1$ that is formed by the first dark part as counted from the surface of the dot on the opposite side of the substrate and the aforementioned surface is in the range of 70° to 90°. Preferably, it is desirable that for all of the dots at the inclined portion or curved surface portion described above, the angle formed by the direction of the normal line to line that is formed by the first dark part as counted from the surface of the dot on the opposite side of the substrate and the aforementioned surface is preferably 70° or larger and more preferably in the range of 80° to 90°. That is, it is desirable that the angle of the dark line satisfies the above-mentioned angle in some part of the inclined portion or the curved surface portion, for example, the angle of the dark line satisfies the aforementioned angle intermittently in some part of the inclined portion or the curved surface portion, and it is preferable to satisfy the aforementioned angle continuously. In a case where the surface is curved in the cross-sectional view, the angle formed by the surface means an angle formed by the tangent line of the surface. This angle is indicated as an acute angle, and, for example, 70° to 90° means that in a case where the angle formed by the normal line and the surface is indicated as an angle of 0° to 180°, the range of angle is 70° to 110°. In regard to the cross-sectional view, it is preferable that all of the lines formed by up to the second dark part as counted from the surface of the dot on the opposite side of the substrate are such that the angle formed by the normal line of the lines, and the aforementioned surface, is in the range of 70° to 90°; it is more preferable that all of the lines formed by up to the $3^{rd}$ or $4^{th}$ dark part as counted from the surface of the dot on the opposite side of the substrate are such that the angle formed by the normal line of the lines and the aforementioned surface is in the range of 70° to 90°; and it is even more preferable that all of the lines formed by up to the $5^{th}$ to $12^{th}$ dark part as counted from the surface of the dot on the opposite side of the substrate are such that the angle formed by the normal line of the lines and the aforementioned surface is in the range of 70° to 90°.

The angle is preferably in the range of 80° to 90°, and more preferably in the range of 85° to 90°.

Furthermore, it is preferable that the angle $\theta_2$ formed by the normal line to line $Ld_2$ that is formed by the second dark part as counted from the surface of the dot on the opposite side of the substrate and the aforementioned surface is in the range of 70° to 90°, and it is preferable that the angle formed by the normal line of the lines formed by the $3^{rd}$ to $20^{th}$ dark part and the aforementioned surface is also in the range of 70° to 90°.

Figure 12:
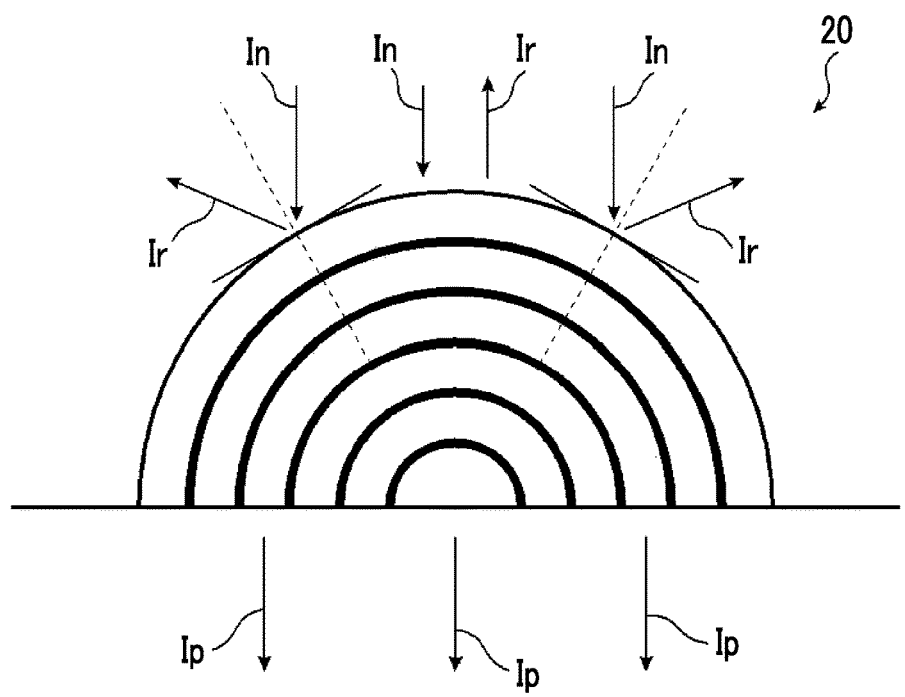
FIG. 12 is a schematic cross-sectional view for explaining the action of dots.

The cross-sectional view provided by SEM shows that at the surface of the dot in the inclined portion or the curved surface portion, the spiral axis of the cholesteric structure forms an angle of 70° or larger or preferably in a range of 80° to 90° with the surface. Due to such a structure, regarding the light entering into the dot, the light entering in the direction that forms an angle in the direction of the normal line to the substrate can be caused to enter at an angle close to be parallel to the direction of the spiral axis of the cholesteric structure at the inclined portion or the curved surface portion. Therefore, the light entering into the dot can be reflected in various directions. Specifically, since the dot causes specular reflection of incident light relative to the spiral axis of the cholesteric structure, as illustrated in FIG. 12, with respect to light In entering in the direction of the normal line to the substrate, reflected light Ir that is reflected in the vicinity of the center of the dot is reflected in parallel to the direction of the normal line to the substrate. Meanwhile, at a position shifted from the center of the dot (position at which the spiral axis of the cholesteric structure is shifted relative to the direction of the normal line to the substrate), the reflected light Ir is reflected in a direction that is different from the direction of the normal line to the substrate. Therefore, the light entering into the dot can be reflected in various directions, and the viewing angle can be widened. Since the light Ip that is transmitted through the dot is transmitted in the same direction as the incident light In, scattering of the transmitted light is suppressed, the haze can be lowered, and transparency can be increased.

It is also preferable that the light entering in the direction of the normal line to the substrate can be reflected in all directions. Particularly, it is preferable that the angle (half-value angle) at which the brightness becomes half the front surface brightness (peak brightness) can be set to 35° or larger, and the transparent screen has high reflectivity.

At the surface of the dot in the inclined portion or the curved surface portion, since the spiral axis of the cholesteric structure and the surface form an angle of 70° or larger or preferably in a range of 80° to 90°, it is preferable that the angle formed by the direction of the normal line to a line that is formed by the first dark part as counted from the surface and the direction of the normal line to the substrate decreases continuously as the height increases continuously.

The cross-sectional view is a cross-sectional view in an arbitrary direction including a portion having a height that increases continuously to the maximum height in the direction extending from the edge of the dot toward the center, and typically, the cross-sectional view is desirably a cross-sectional view of an arbitrary surface that includes the center of the dot and is perpendicular to the substrate.

(Method for Producing Cholesteric Structure)

A cholesteric structure can be obtained by immobilizing a cholesteric liquid crystal phase. The structure in which a cholesteric liquid crystal phase is immobilized may be a structure in which the orientation of the liquid crystal compound that forms the cholesteric liquid crystal phase is retained, and typically, the structure may be a structure in which a polymerizable liquid crystal compound is brought into an orientation state of the cholesteric liquid crystal phase and then is polymerized and cured by ultraviolet irradiation, heating or the like, and a layer lacking fluidity is formed and simultaneously changed into a state that is free of any factor causing a change in the orientation state by an external field or an external force. Meanwhile, in regard to the structure obtained by immobilizing the cholesteric liquid crystal phase, it is sufficient in a case where the optical properties of the cholesteric liquid crystal phase are retained, and it is acceptable in a case where the liquid crystal compound has already stopped exhibiting liquid crystal properties. For example, it is acceptable that the polymerizable liquid crystal compound is macromolecularized by a curing reaction and thereby has already lost liquid crystallinity.

The material used for forming the cholesteric structure may be a liquid crystal composition including a liquid crystal compound. The liquid crystal compound is preferably a polymerizable liquid crystal compound.

The liquid crystal composition including a polymerizable liquid crystal compound further includes a surfactant. The liquid crystal composition may further include a chiral agent and a polymerization initiator.

——Polymerizable Liquid Crystal Compound——

The polymerizable liquid crystal compound may be a rod-like liquid crystal compound or a disc-like liquid crystal compound; however, it is preferable that the polymerizable liquid crystal compound is a rod-like liquid crystal compound.

Examples of a rod-like polymerizable liquid crystal compound that forms a cholesteric liquid crystal layer include a rod-like nematic liquid crystal compound. As the rod-like nematic liquid crystal compound, azomethines, azoxys, cyanobiphenyls, cyanophenyl esters, benzoic acid esters, cyclohexanecarboxylic acid phenyl esters, cyanophenylcyclohexanes, cyano-substituted phenylpyrimidines, alkoxy-substituted phenylpyrimidines, phenyldioxanes, tolanes, and alkenylcyclohexylbenzonitriles are preferably used. Low molecular weight liquid crystal compounds as well as polymeric liquid crystal compounds can be used.

A polymerizable liquid crystal compound can be obtained by introducing a polymerizable group into a liquid crystal compound. Examples of the polymerizable group include an unsaturated polymerizable group, an epoxy group, and an aziridinyl group, and an unsaturated polymerizable group is preferred, while an ethylenically unsaturated polymerizable group is particularly preferred. A polymerizable group can be introduced into a molecule of a liquid crystal compound by various methods. The number of polymerizable groups that a polymerizable liquid crystal compound can have is preferably 1 to 6, and more preferably 1 to 3. Examples of the polymerizable liquid crystal compound include the compounds described in Makromol. Chem., Vol. 190, p. 2255 (1989); Advanced Materials, Vol. 5, p. 107 (1993); U.S. Pat. Nos. 4,683,327A, 5,622,648A, 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), and JP2001-328973A. Two or more kinds of polymerizable liquid crystal compounds may be used in combination. In a case where two or more kinds of polymerizable liquid crystal compounds are used in combination, the orientation temperature can be lowered.

Specific examples of the polymerizable liquid crystal compound include compounds represented by General Formulae (1) to (11).

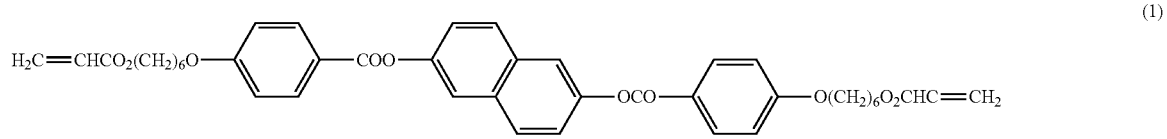

(1)

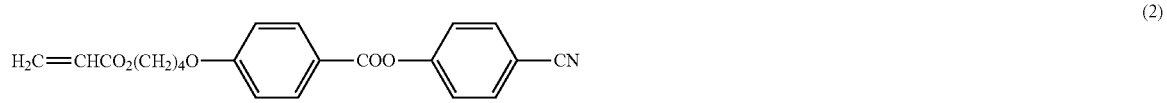

(2)

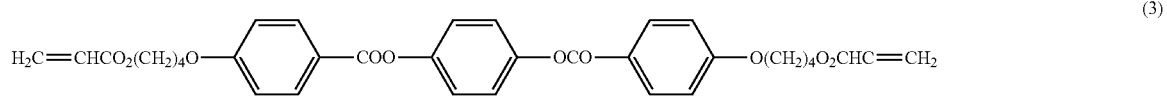

(3)

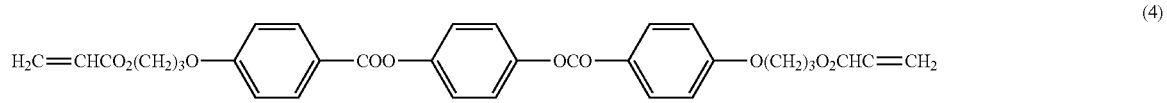

(4)

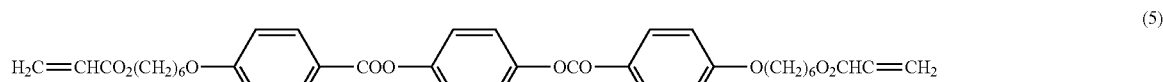

(5)

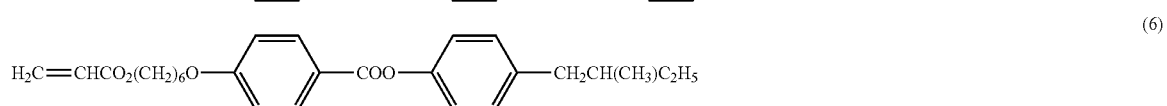

(6)

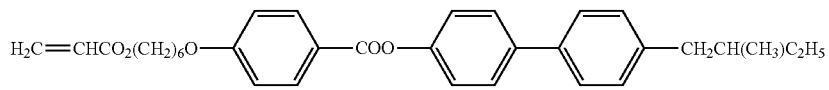

(7)

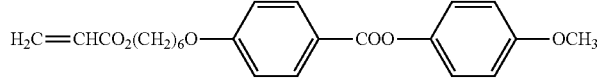

(8)

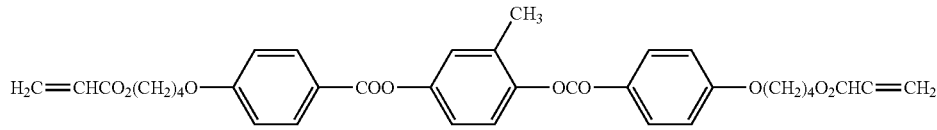

(9)

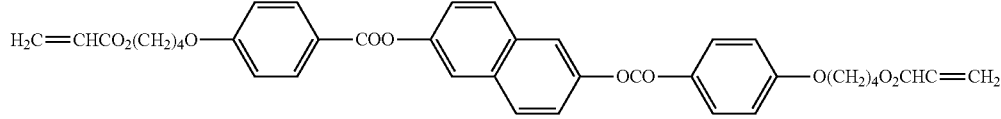

(10)

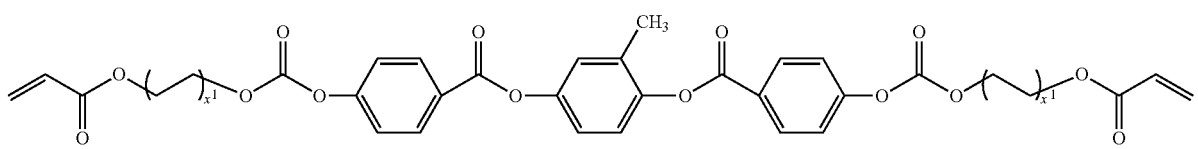

(11)

[In Compound (11), $X^1$ is 2 to 5 (Integer).]

As a polymerizable liquid crystal compound other than those described above, cyclic organopolysiloxane compounds having a cholesteric phase as disclosed in JP1982-165480A (JP-S57-165480A), and the like can be used. Furthermore, regarding the polymeric liquid crystal compound described above, a polymer in which a mesogenic group that exhibits liquid crystallinity has been introduced into a position at the main chain, a side chain, or both of the main chain and a side chain; a polymer cholesteric liquid crystal in which a cholesteryl group has been introduced into a side chain; the liquid crystalline polymer disclosed in JP1997-133810A (JP-H09-133810A); the liquid crystalline polymer disclosed in JP1999-293252A (JP-H11-293252A), and the like can be used.

The amount of addition of the polymerizable liquid crystal compound in the liquid crystal composition is preferably 75% to 99.9% by mass, more preferably 80% to 99% by mass, and particularly preferably 85% to 90% by mass, with respect to the solid content mass (mass excluding the solvent) of the liquid crystal composition.

——Surfactant——

It is desirable that the surfactant is a surfactant in which by adding a surfactant to the liquid crystal composition that is used in a case where dots are formed, the polymerizable liquid crystal compound is horizontally oriented on the air interface side at the time of forming the dots, and dots having the direction of the spiral axis controlled as explained above are obtained.

The surfactant is preferably a compound capable of functioning as an orientation controlling agent that contributes in order to obtain a cholesteric structure with planar orientation stably and rapidly. Examples of the surfactant include silicone-based surfactants and fluorine-based surfactants, and fluorine-based surfactants are preferred.

Specific examples of the surfactant include the compounds described in paragraphs [0082] to [0090] of JP2014-119605A, the compounds described in paragraphs [0031] to [0034] of JP2012-203237A, the compounds listed as examples in paragraphs [0092] and [0093] of JP2005-99248A, the compounds listed as examples in paragraphs [0076] to [0078] and paragraphs [0082] to [0085] of JP2002-129162A, and the fluoro(meth)acrylate-based polymers described in paragraphs [0018] to [0043] of JP2007-272185A.

As the horizontal orientation agent, one kind of agent may be used singly, or two or more kinds of agents may be used in combination.

As the fluorine-based surfactant, a compound represented by General Formula (I) described in paragraphs [0082] to [0090] of JP2014-119605A is particularly preferred.

$(Hb^{11}\text{-}Sp^{11}\text{-}L^{11}\text{-}Sp^{12}\text{-}L^{12})_{m11}\text{-}A^{11}\text{-}L^{13}\text{-}T^{11}L^{14}\text{-}A^{12}\text{-}(L^{15}\text{-}Sp^{13}\text{-}L^{16}\text{-}Sp^{14}\text{-}Hb^{11})_{n11}$   General Formula (I)

In General Formula (I), $L^{11}$, $L^{12}$, $L^{13}$, $L^{14}$, $L^{15}$, and $L^{16}$ each independently represent a single bond, —O—, —S—, —CO—, —COO—, —OCO—, —COS—, —SCO—, —NRCO—, or —CONR— (wherein R in General Formula (I) represents a hydrogen atom or an alkyl group having 1 to 6 carbon atoms). —NRCO— and —CONR— have an effect of lowering solubility. —O—, —S—, —CO—, —COO—, —OCO—, —COS—, or —SCO— is more preferable, from the viewpoint of having a tendency that the haze increases at the time of producing dots, and —O—, —CO—, —COO—, or —OCO— is even more preferable, from the viewpoint of stability of the compound. The alkyl group that can be adopted by R may be linear or branched. The number of carbon atoms is more preferably 1 to 3, and examples include a methyl group, an ethyl group, and an n-propyl group.

$Sp^{11}$, $Sp^{12}$, $Sp^{13}$, and $Sp^{14}$ each independently represent a single bond or an alkylene group having 1 to 10 carbon atoms, and are each more preferably a single bond or an alkylene group having 1 to 7 carbon atoms, and even more preferably a single bond or an alkylene group having 1 to 4 carbon atoms. However, the hydrogen atoms of the alkylene group may be substituted by fluorine atoms. The alkylene group may or may not be branched; however, an unbranched, linear alkylene group is preferred. From the viewpoint of synthesis, it is preferable that $Sp^{11}$ and $Sp^{14}$ are identical, while $Sp^{12}$ and $Sp^{13}$ are identical.

$A^{11}$ and $A^{12}$ each represent a monovalent to tetravalent aromatic hydrocarbon group. The number of carbon atoms of the aromatic hydrocarbon group is preferably 6 to 22, more preferably 6 to 14, even more preferably 6 to 10, and still more preferably 6. The aromatic hydrocarbon group represented by $A^{11}$ or $A^{12}$ may have a substituent. Examples of such a substituent include an alkyl group having 1 to 8 carbon atoms, an alkoxy group, a halogen atom, a cyano group, and an ester group. Regarding an explanation on these groups and preferred ranges thereof, reference can be made to the description concerning the following T. Examples of the substituent for the aromatic hydrocarbon group represented by $A^{11}$ or $A^{12}$ include a methyl group, an ethyl group, a methoxy group, an ethoxy group, a bromine atom, a chlorine atom, and a cyano group. A molecule having many perfluoroalkyl moieties in the molecule can orient liquid crystal molecules even in a case of being added in a small amount, and since this leads to a decrease in the haze, it is preferable that $A^{11}$ and $A^{12}$ are tetravalent so as to have more many perfluoroalkyl groups in the molecule. From the viewpoint of synthesis, it is preferable that $A^{11}$ and $A^{12}$ are identical.

It is preferable that $T^{11}$ represents a divalent group represented by

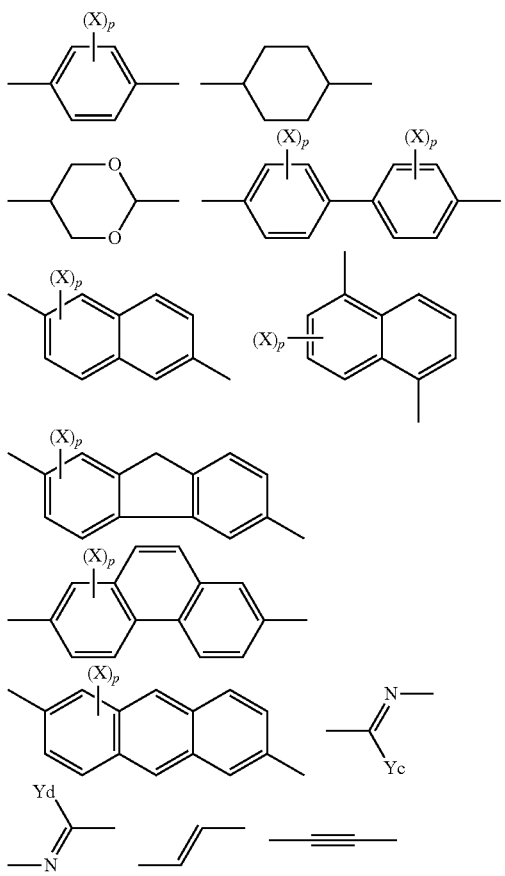

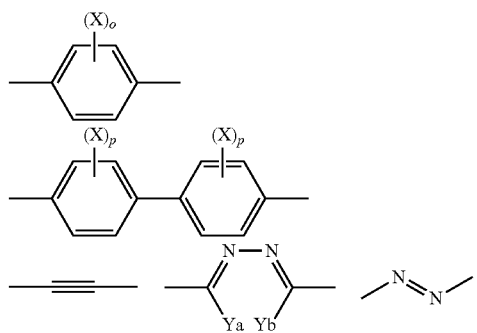

or a divalent aromatic heterocyclic group (wherein X included in $T^{11}$ represents an alkyl group having 1 to 8 carbon atoms, an alkoxy group, a halogen atom, a cyano group, or an ester group; and Ya, Yb, Yc, and Yd each independently represent a hydrogen atom or an alkyl group having 1 to 4 carbon atoms), and $T^{11}$ is more preferably,

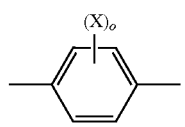

and even more preferably,

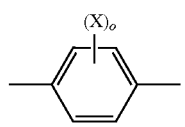

The number of carbon atoms of the alkyl group that can be adopted by X included in $T^{11}$ is 1 to 8, preferably 1 to 5, and more preferably 1 to 3. The alkyl group may be any of a linear group, a branched group, and a cyclic group, and the alkyl group is preferably a linear or branched group. Preferred examples of the alkyl group include a methyl group, an ethyl group, an n-propyl group, and an isopropyl group, and among them, a methyl group is preferred. For the alkyl moiety of the alkoxy group that can be adopted by X included in $T^{11}$, reference can be made to the explanation and preferred range for the alkyl group that can be adopted by X included in $T^{11}$. Examples of the halogen atom that can be adopted by X include in $T^{11}$ include a fluorine atom, a chlorine atom, a bromine atom, and an iodine atom, and a chlorine atom and a bromine atom are preferred. Examples of the ester group that can be adopted by X included in $T^{11}$ include a group represented by R'COO—. R' may be an alkyl group having 1 to 8 carbon atoms. Regarding the explanation and a preferred range for the alkyl group that can be adopted by R', reference can be made to the explanation and preferred range for the alkyl group that can be adopted by X included in $T^{11}$. Specific examples of the ester include $CH_3COO-$ and $C_2H_5COO-$. The alkyl group having 1 to 4 carbon atoms that can be adopted by Ya, Yb, Yc, and Yd may be a linear group or a branched group. Examples thereof include a methyl group, an ethyl group, an n-propyl group, and an isopropyl group.

It is preferable that the divalent aromatic heterocyclic group has a 5-membered, 6-membered, or 7-membered heterocyclic ring. A 5-membered ring or a 6-membered ring is more preferred, and a 6-membered ring is most preferred. Preferred examples of the heteroatom that constitutes the heterocyclic ring include a nitrogen atom, an oxygen atom, and a sulfur atom. The heterocyclic ring is preferably an aromatic heterocyclic ring. The aromatic heterocyclic ring is generally an unsaturated heterocyclic ring. An unsaturated heterocyclic ring having the largest number of double bonds is more preferred. Examples of the heterocyclic ring include a furan ring, a thiophene ring, a pyrrole ring, a pyrroline ring, a pyrrolidine ring, an oxazole ring, an isoxazole ring, a thiazole ring, an isothiazole ring, an imidazole ring, an imidazoline ring, an imidazolidine ring, a pyrazole ring, a pyrazoline ring, a pyrazolidine ring, a triazole ring, a furazan ring, a tetrazole ring, a pyran ring, a thiine ring, a pyridine ring, a piperidine ring, an oxazine ring, a morpholine ring, a thiazine ring, a pyridazine ring, a pyrimidine ring, a pyrazine ring, a piperazine ring, and a triazine ring. The divalent heterocyclic group may have a substituent. Regarding the explanation and preferred ranges for the examples of the substituent, reference can be made to the explanation and description related to the substituent that can be adopted by the monovalent to tetravalent aromatic hydrocarbon of $A^1$ and $A^2$.

$Hb^{11}$ represents a perfluoroalkyl group having 2 to 30 carbon atoms, and $Hb^{11}$ is more preferably a perfluoroalkyl group having 3 to 20 carbon atoms, and even more preferably a perfluoroalkyl group having 3 to 10 carbon atoms. The perfluoroalkyl group may be any of a linear group, a branched group, and a cyclic group; however, the perfluoroalkyl group is preferably a linear or branched group, and more preferably a linear group.

m11 and n11 each independently represent 0 to 3, and m11+n11≥1. At this time, a plurality of the structures described within the parentheses may be identical with or different from each other; however, it is preferable that the structures are identical with each other. m11 and n11 in General Formula (I) are determined based on the valence of $A^{11}$ and $A^{12}$, and preferred ranges thereof are also determined based on the preferred ranges for the valence of $A^{11}$ and $A^{12}$.

o and p included in $T^{11}$ each independently represent an integer of 0 or larger, and in a case where o and p are 2 or larger, the plurality of X's may be identical with or different from each other. o included in $T^{11}$ is preferably 1 or 2. p included in $T^{11}$ is preferably an integer of 1 to 4, and more preferably 1 or 2.

The compound represented by General Formula (I) is such that the molecular structure may have symmetry, or may not have symmetry. The term symmetry as used herein means that the molecular structure corresponds to at least any one of point symmetry, line symmetry, and rotational symmetry, and the term asymmetry means that the molecular structure does not correspond to any of point symmetry, line symmetry, and rotational symmetry.

The compound represented by General Formula (I) is a compound in which the perfluoroalkyl group ($Hb^{11}$) described above, linking groups -(-$Sp^{11}$-$L^{11}$-$Sp^{12}$-$L^{12}$)$m_{11}$-$A^{11}$-$L^{13}$- and -$L^{14}$-$A^{12}$-($L^{15}$-$Sp^{13}$-$L^{16}$-$Sp^{14}$-)$n_{11}$-, and T, which isp referably a divalent group having an excluded volume effect, are combined. It is preferable that the two perfluoroalkyl group ($Hb^{11}$) existing in the molecule are identical with each other, and it is also preferable that the linking groups -(-$Sp^{11}$-$L^{11}$-$Sp^{12}$-$L^{12}$)$m_{11}$-$A^{11}$-$L^{13}$- and -$L^{14}$-$A^{12}$-($L^{15}$-$Sp^{13}$-$L^{16}$-$Sp^{14}$-)$n_{11}$- existing in the molecule are also identical with each other. It is preferable that terminal $Hb^{11}$-$Sp^{11}$-$L^{11}$-$Sp^{12}$- and -$Sp^{13}$-$L^{16}$-$Sp^{14}$-$Hb^{11}$ are groups represented by any of the following general formulae.

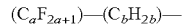

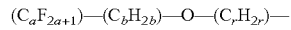

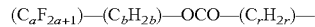

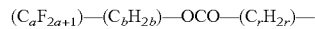

In the above formulae, a is preferably 2 to 30, more preferably 3 to 20, and even more preferably 3 to 10. b is preferably 0 to 20, more preferably 0 to 10, and even more preferably 0 to 5. a+b is 3 to 30. r is preferably 1 to 10, and more preferably 1 to 4.

Furthermore, it is preferable that the terminal $Hb^{11}$-$Sp^{11}$-$L^{11}$-$Sp^{12}$-$L^{12}$- and -$L^{15}$-$Sp^{13}$-$L^{16}$-$Sp^{14}$-$Hb^{11}$ in General Formula (I) are each a group represented by any of the following general formulae.

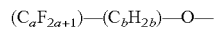

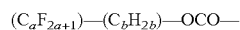

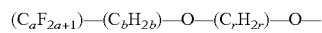

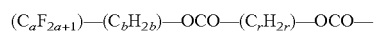

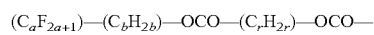

The definitions of a, b, and r in the above formulae are the same as the definitions given right above.

The amount of addition of the surfactant in the liquid crystal composition is preferably 0.01% by mass to 10% by mass, more preferably 0.01% by mass to 5% by mass, and particularly preferably 0.02% by mass to 1% by mass, with respect to the total mass of the polymerizable liquid crystal compound.

——Chiral Agent (Optically Active Compound)——

A chiral agent has a function of creating a spiral structure of the cholesteric liquid crystal phase. Since chiral compounds have different directions of twist of the spiral or different pitches of the spiral created by the compounds, the chiral compound may be selected according to the purpose.

There are no particular limitations on the chiral agent, and known compounds (for example, described in Handbook of Liquid Crystal Devices, Chapter 3, Section 4-3, Chiral agents for TN and STN, p. 199, edited by the $142^{nd}$ Committee of Japan Society for the Promotion of Science (1989)), isosorbide, and isomannide derivatives can be used.

A chiral agent generally includes an asymmetric carbon atom; however, an axially asymmetric compound or a plane-asymmetric compound, which does not include an asymmetric carbon atom, can also be used as a chiral agent. Examples of the axially asymmetric compound or plane-asymmetric compound include binaphthyl, helicene, para-cyclophane, and derivatives thereof. The chiral agent may have a polymerizable group. In a case in which both the chiral agent and the liquid crystal compound have a polymerizable group, a polymer having a repeating unit derived from a polymerizable liquid crystal compound and a repeating unit derived from a chiral agent can be formed by a polymerization reaction between the polymerizable chiral agent and the polymerizable liquid crystal compound. In the aspect, it is preferable that the polymerizable group of the polymerizable chiral agent is a group of the same kind as the polymerizable group of the polymerizable liquid crystal compound. Therefore, it is preferable that the polymerizable group of the chiral agent is also an unsaturated polymerizable group, an epoxy group, or an aziridinyl group; more preferably an unsaturated polymerizable group; and particularly preferably an ethylenically unsaturated polymerizable group.

The chiral agent may also be a liquid crystal compound.

In a case in which the chiral agent has a photoisomerizable group, it is preferable since a desired pattern of reflection wavelength corresponding to the emitted light wavelength can be formed by photo mask irradiation with actinic rays or the like after application and orientation. The photoisomerizable group is preferably an isomerization site of a compound exhibiting photochromic properties, an azo group, an azoxy group, or a cinnamoyl group. Specific compounds that can be used include the compounds described in JP2002-80478A, JP2002-80851A, JP2002-179668A, JP2002-179669A, JP2002-179670A, JP2002-179681A, JP2002-179682A, JP2002-338575A, JP2002-338668A, JP2003-313189A, and JP2003-313292A.

Specific examples of the chiral agent include a compound represented by Formula (12).

the crosslinking agent, an agent capable of curing by means of ultraviolet radiation, heat, moisture, or the like can be suitably used.

The crosslinking agent is not particularly limited and can be appropriately selected according to the purpose. Examples include polyfunctional acrylate compounds such as trimethylolpropane tri(meth)acrylate and pentaerythritol tri(meth)acrylate; epoxy compounds such as glycidyl (meth) acrylate and ethylene glycol diglycidyl ether; aziridine compounds such as 2,2-bishydroxymethylbutanol tris [3-(1-aziridinyl) propionate] and 4,4-bis (ethyleneiminocarbonylamino)diphenylmethane; isocyanate compounds such as hexamethylene diisocyanate and biuret type isocyanate; polyoxazoline compounds having an oxazoline group in a side chain; and alkoxysilane compounds such as vinyltrimethoxysilane and N-(2-amino-ethyl)-3-aminopropyltrimethoxysilane. Furthermore, a known catalyst can be used according to the reactivity of the crosslinking agent, and thus productivity can be enhanced in

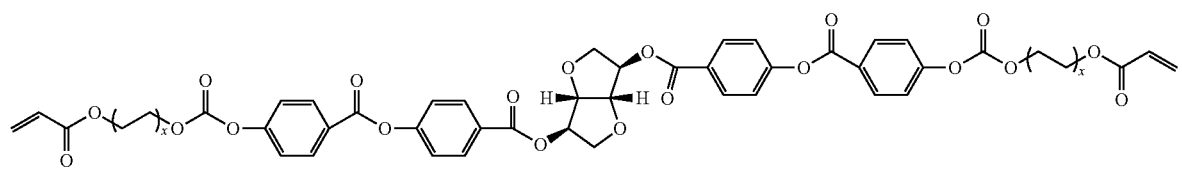

(12)

In the formula, X represents 2 to 5 (integer).

The content of the chiral agent in the liquid crystal composition is preferably 0.01 mol % to 200 mol %, and more preferably 1 mol % to 30 mol %, of the amount of the polymerizable liquid crystal compound.

——Polymerization Initiator——

In a case in which a polymerizable compound is included in the liquid crystal composition, it is preferable that the liquid crystal composition includes a polymerization initiator. In an aspect of carrying out a polymerization reaction by ultraviolet irradiation, the polymerization initiator to be used is preferably a photopolymerization initiator capable of initiating the polymerization reaction by ultraviolet irradiation. Examples of the photopolymerization initiator include α-carbonyl compounds (described in U.S. Pat. Nos. 2,367,661A and 2,367,670A), acyloin ethers (described in U.S. Pat. No. 2,448,828A), α-hydrocarbon-substituted aromatic acyloin compounds (described in U.S. Pat. No. 2,722,512A), polynuclear quinone compounds (described in U.S. Pat. Nos. 3,046,127A and 2,951,758A), combinations of a triarylimidazole dimer and p-aminophenyl ketone (described in U.S. Pat. No. 3,549,367A), acridine and phenazine compounds (described in JP1985-105667A (JP-S60-105667A) and U.S. Pat. No. 4,239,850A), and oxadiazole compounds (described in U.S. Pat. No. 4,212,970A).

The content of the photopolymerization initiator in the liquid crystal composition is preferably 0.1% to 20% by mass, and more preferably 0.5% by mass to 12% by mass, with respect to the content of the polymerizable liquid crystal compound.

——Crosslinking Agent——

The liquid crystal composition may optionally include a crosslinking agent for the purpose of enhancing the film hardness after curing and enhancing durability. Regarding addition to the enhancement of film hardness and durability. These may be used singly or in combination of two or more kinds thereof.

The content of the crosslinking agent is preferably 3% by mass to 20% by mass, and more preferably 5% by mass to 15% by mass. In a case where the content of the crosslinking agent is 3% by mass or more, an effect of increasing the crosslinking density may be obtained, and in a case where the content is 20% by mass or less, stability of the cholesteric liquid crystal layer may be deteriorated.

——Other Additives——

In the case of using the inkjet method that will be described below as the method for forming dots, a monofunctional polymerizable monomer may be used in order to obtain ink physical properties that are generally required. Examples of the monofunctional polymerizable monomer include 2-methoxyethyl acrylate, isobutyl acrylate, isooctyl acrylate, isodecyl acrylate, and octyl/decyl acrylate.

The liquid crystal composition may further include, if necessary, a polymerization inhibitor, an antioxidant, an ultraviolet absorber, a photostabilizer, a coloring material, and metal oxide fine particles, to the extent that the optical performance and the like are not deteriorated.

It is preferable that the liquid crystal composition is used as a liquid at the time of forming the dots.

The liquid crystal composition may include a solvent. The solvent is not particularly limited and can be appropriately selected according to the purpose; however, an organic solvent is preferably used.

The organic solvent is not particularly limited and can be appropriately selected according to the purpose. Examples thereof include ketones such as methyl ethyl ketone and methyl isobutyl ketone; alkyl halides, amides, sulfoxides, heterocyclic compounds, hydrocarbons, esters, and ethers. These may be used singly or in combination of two or more kinds thereof. Among these, in a case where the environmental burden is taken into consideration, ketones are particularly preferred. The above-mentioned components such as the monofunctional polymerizable monomer may also function as the solvent.

The liquid crystal composition is applied onto a substrate and then is cured. Thus, dots are formed. Application of the liquid crystal composition onto the substrate is preferably carried out by applying as droplets. In a case where a plurality (usually, a large number) of dots are applied onto the substrate, printing by using the liquid crystal composition as an ink may be carried out. The printing method is not particularly limited, and an inkjet method, a gravure printing method, a flexographic printing method, and the like can be used; however, an inkjet method is particularly preferred. A pattern of dots can also be formed by applying a known printing technology.

As illustrated in FIG. 4 to FIG. 7, in the case of a dot having a plurality of regions that reflect light in wavelength regions different from each other in a single dot, or in the case of a dot having a layer reflecting right-handed circularly polarized light and a region reflecting left-handed circularly polarized light in a single dot, first, a first layer is formed by applying as droplets a liquid crystal composition that becomes a layer on the substrate side by the above-mentioned printing method and curing the liquid crystal composition, and then a second layer is formed by applying as droplets a liquid crystal composition that becomes a second layer over the first layer and curing the liquid crystal composition. Furthermore, a third layer and so forth are also formed by the same method. Thereby, a dot having a plurality of regions having different wavelength regions or directions of polarization of reflected light can be formed.

The liquid crystal composition after being applied onto the substrate is dried or heated as necessary, and then is cured. It is desirable in a case where the polymerizable liquid crystal compound in the liquid crystal composition is oriented by the process of drying or heating. In the case of performing heating, the heating temperature is preferably 200° C. or lower, and more preferably 130° C. or lower.

The liquid crystal compound thus oriented may be further polymerized. Polymerization may be any of thermal polymerization and photopolymerization based on light irradiation; however, photopolymerization is preferred. It is preferable to use ultraviolet radiation for light irradiation. The irradiation energy is preferably 20 mJ/cm$^2$ to 50 J/cm$^2$, and more preferably 100 mJ/cm$^2$ to 1,500 mJ/cm$^2$. In order to accelerate the photopolymerization reaction, light irradiation may be carried out under heating conditions or in a nitrogen atmosphere. The wavelength of ultraviolet radiation radiated is preferably 250 nm to 430 nm. The polymerization reaction ratio is preferably higher from the viewpoint of stability, and the polymerization reaction ratio is preferably 70% or higher, and more preferably 80% or higher.

The polymerization reaction ratio can be determined by determining the consumption ratio of the polymerizable functional group using an IR absorption spectrum.

[Overcoat Layer]

The transparent screen may include an overcoat layer. The overcoat layer may be provided on the surface side of the substrate where the dots have been formed, and it is preferable that the overcoat layer flattens the surface of the transparent screen.

The overcoat layer is not particularly limited; however, as described above, it is preferable as the difference in the refractive index between the overcoat layer and the dots is smaller, and it is preferable that the difference in the refractive index is 0.04 or less. Since the refractive index of the dots formed of a liquid crystal material is about 1.6, it is preferable that the overcoat layer is a resin layer having a refractive index of about 1.4 to 1.8. By using an overcoat layer having a refractive index that is close to the refractive index of the dots, the angle of light that actually enters into the dot from the normal line (polar angle) can be made smaller. For example, in a case where light is caused to enter the transparent screen at a polar angle of 45° using an overcoat layer having a refractive index of 1.6, the polar angle of light that actually enters the dot can be adjusted to about 27°. Therefore, by using an overcoat layer, the polar angle of light at which the transparent screen exhibits recursive reflectivity can be extended, and even for a dot having a small angle formed by the surface of the dot on the opposite side of the substrate and the substrate, higher recursive reflectivity can be obtained in a wider range. The overcoat layer may also have a function as an antireflection layer, a pressure sensitive adhesive layer, an adhesive layer, or a hard coat layer.

An example of the overcoat layer may be a resin layer obtainable by applying a composition including a monomer on the surface side of the substrate where dots have been formed, and then curing the coating film. The resin is not particularly limited, and the resin may be selected in consideration of adhesiveness to the substrate or the liquid crystal material with which the dots are formed, or the like. For example, a thermoplastic resin, a thermosetting resin, and an ultraviolet-curable resin can be used. In view of durability, solvent resistance, and the like, a resin of the type that is cured by crosslinking is preferred, and particularly, an ultraviolet-curable resin that can be cured in a short period of time is preferred. Examples of the monomer that can be used to form the overcoat layer include ethyl (meth)acrylate, ethylhexyl (meth)acrylate, styrene, methylstyrene, N-vinylpyrrolidone, polymethylolpropane tri(meth)acrylate, hexanediol (meth)acrylate, tripropylene glycol di(meth) acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth) acrylate.

The thickness of the overcoat layer is not particularly limited, and may be determined in consideration of the maximum height of the dot. The thickness may be about 5 μm to 100 μm, preferably 10 μm to 50 μm, and more preferably 20 μm to 40 μm. The thickness is the distance from the dot-formed surface of the substrate in the area where there are no dots, to the surface of the overcoat layer on the opposite surface.

[Adhesive Layer]

The transparent screen may include an adhesive layer for laminating two substrates. It is desirable that the adhesive layer can adhere two substrates, and has transparency.

The adhesive layer is not particularly limited; however, similar to the overcoat layer, it is preferable as the difference in the refractive index between the adhesive layer and the dots is smaller.

As the adhesive layer, known pressure sensitive adhesives and adhesives can be used.

For example, the pressure sensitive adhesive represents a substance in which a ratio (tan δ=G"/G') of loss modulus G" to storage modulus G' measured by dynamic viscoelasticity measurement device is 0.001 to 1.5, that is, a pressure sensitive adhesive, a substance which easily creeps, or the like is included. Examples of the pressure sensitive adhesive include a polyvinyl alcohol-based pressure sensitive adhesive, but are not limited thereto.

The thickness of the adhesive layer is not particularly limited, and may be determined in consideration of the maximum height of the dot. The thickness may be about 5 μm to 100 μm, preferably 10 μm to 50 μm, and more preferably 20 μm to 40 μm. The thickness is the distance from one substrate surface to the other substrate surface.

Next, a 3D display system using the transparent screen for 3D display of the invention will be explained with reference to FIG. 9A and FIG. 9B.

Figure 9A:
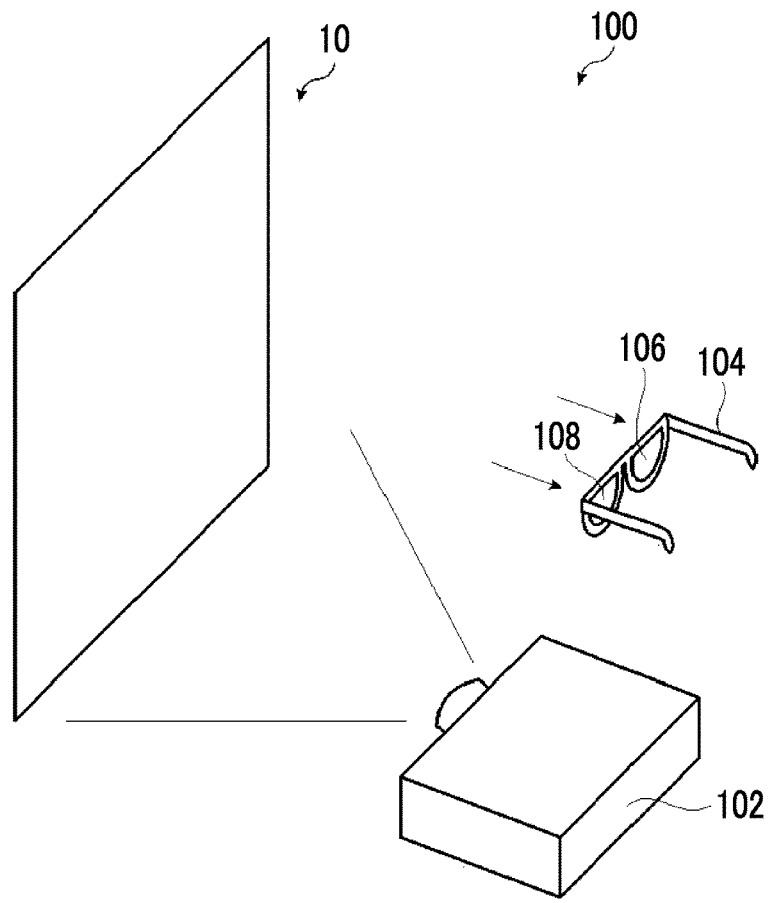
FIG. 9A is a perspective view conceptually illustrating a 3D display system of the invention.

A 3D display system illustrated in FIG. 9A includes the transparent screen 10 of the invention described above, a projecting device 102 that projects a video image on the transparent screen 10, and 3D glasses 104 in which a viewer wears.

The projecting device 102 is a known 3D projector which alternatingly projects an image for a right eye and an image for a left eye by light with different polarization directions.

Figure 9B:
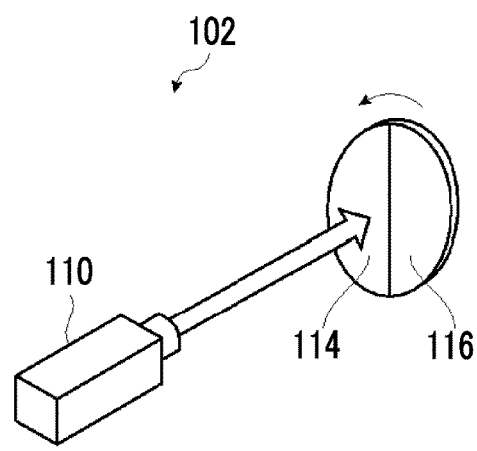
FIG. 9B is a perspective view conceptually illustrating a configuration of a projecting device.

As an example, as illustrated in FIG. 9B, the projecting device 102 has a light source 110 for emitting video light while the image for a right eye and the image for a left eye are alternately being switched, and a circular polarization unit 112 which is disposed near an emitting port of light from the light source 110, receives the video light emitted from the light source 110, performs circular polarization on the video light.

The light source 110 has the same configuration as the optical systems of the projectors in the related art such as a liquid crystal display (LCD) system, a digital light processing (DLP) system, and a liquid crystal on silicon (LCOS) system, except that irradiation of video light is performed while the image for a right eye and the image for a left eye are alternatingly being switched.

The circular polarization unit 112 has a right-handed circularly polarizing plate 114 which right-handed circularly polarizes the video light emitted from the light source and made incident, on one semicircular region in a circular shape, and a left-handed circularly polarizing plate 116 which left-handed circularly polarizes the video light, on the other semicircular region.

The circular polarization unit 112 performs circular polarization on the video light which becomes the image for a right eye in one direction and performs circular polarization on the video light which becomes the image for a left eye in the other direction, by rotating the image for a right eye and the image for a left eye emitted from the light source 110 in accordance with switching of these images.

The configuration of projecting device 102 is not limited thereto, and for example, a configuration including a light source (projector) for emitting the video light of the image for a right eye and a light source (projector) for emitting the video light of the image for a left eye may be employed.

The 3D glasses 104 is used in a case where the viewer views the video image emitted from of projecting device 102 and reflected on the transparent screen 10, and has a right-eye polarizing filter 106 which transmits circularly polarized light with one direction to a right eye side and shields circularly polarized light with the other direction and a left-eye polarizing filter 108 which transmits circularly polarized light with the other direction to a left eye side and shields circularly polarized light with the one direction.

By viewing the video image reflected on the transparent screen 10 through the 3D glasses 104, only the video light which becomes the image for a right eye circularly polarized in the one direction is incident onto the right eye of the viewer and only the video light which becomes the image for a left eye circularly polarized in the other direction is incident onto the left eye of the viewer. Therefore, each of right and left eyes sees only a designated frame, and thus the viewer three-dimensionally views a video image.

Thus, the transparent screen for 3D display and the 3D display system of the invention has been explained in detail; however, the invention is not intended to be limited to the examples described above. It is obvious that various improvements and modifications may be made to the extent that the gist of the invention is maintained.

EXAMPLES

Features of the invention will be more specifically explained below by way of Examples. The materials, reagents, amounts of use, amounts of materials, ratios, treatments, procedures, and the like disclosed in the following Examples can be modified as appropriate as long as the gist of the invention is maintained. Therefore, the scope of the invention should not be interpreted limitedly by the specific examples described below.

Example 1

(Production of Underlayer)

A composition as described below was stirred and dissolved in a vessel that had been kept warm at 25° C., and thus an underlayer solution was prepared.

| Underlayer solution (parts by mass) | |
|---|---|
| Propylene glycol monomethyl ether acetate | 1,000 |
| Dipentaerythritol hexaacrylate (manufactured by Nippon Kayaku Co., Ltd., trade name: KAYARAD DPHA) | 15.0 |
| MEGAFAC RS-90 (manufactured by DIC Corporation) | 85 |
| IRGACURE 819 (manufactured by BASF SE) | 3 |

The underlayer solution prepared as described above was applied on a transparent PET film (polyethylene terephthalate, manufactured by Toyobo Co., Ltd., COSMOSHINE A4100) having a thickness of 100 μm using a bar coater at a coating amount of 3 mL/m². Subsequently, the substrate was heated so as to obtain a film surface temperature of 90° C., and the solution was dried for 120 seconds. Then, the underlayer solution was irradiated with ultraviolet radiation at a dose of 700 mJ/cm² using an ultraviolet irradiation apparatus in an atmosphere purged with nitrogen at an oxygen concentration of 100 ppm or less, a crosslinking reaction was carried out, and an underlayer id formed. Thus, a substrate A was produced.

(Formation of Cholesteric Liquid Crystal Dots)

A composition as described below was stirred and dissolved in a vessel that had been kept warm at 25° C., and thus a cholesteric liquid crystal ink solution Gm (liquid crystal composition) was prepared.

| Cholesteric liquid crystal ink solution Gm (parts by mass) | |
|---|---|
| Methoxyethyl acrylate | 145.0 |
| Mixture of rod-like liquid crystal compounds as described below | 100.0 |
| IRGACURE 819 (manufactured by BASF SE) | 10.0 |
| Chiral agent A having the following structure | 5.78 |
| Surfactant having the following structure | 0.08 |

Rod-Like Liquid Crystal Compound

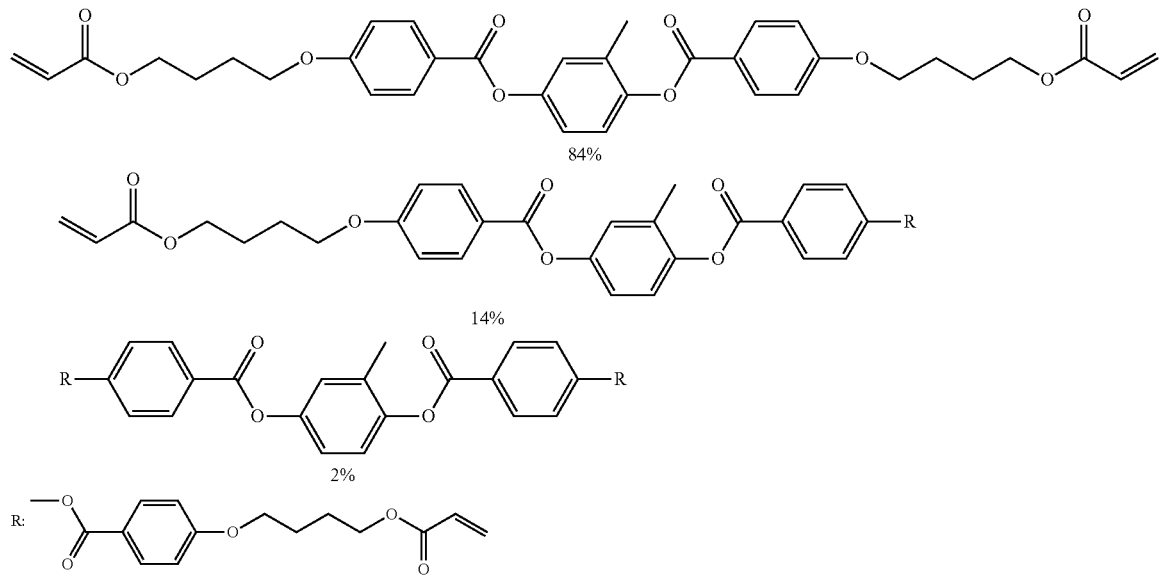

The numerical values are expressed in % by mass. R represents a group that is bonded to oxygen atom.

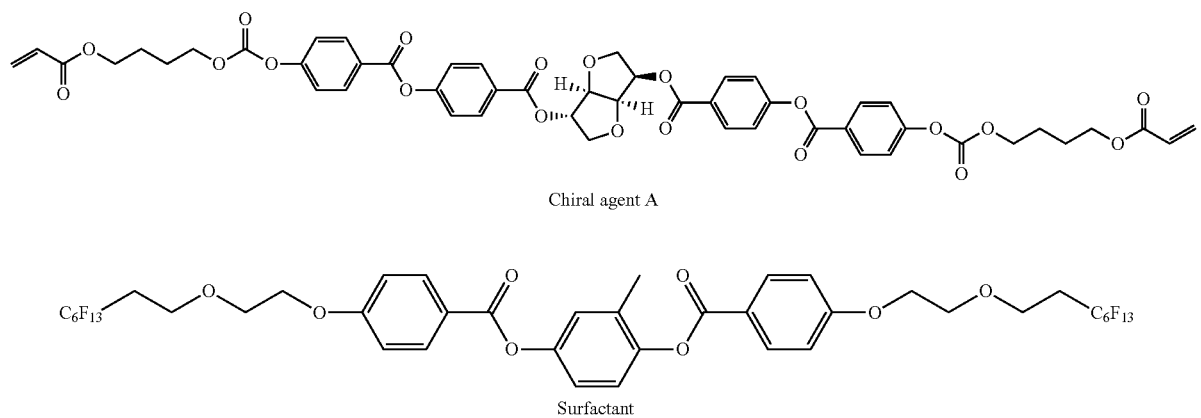

The cholesteric liquid crystal ink solution Gm is a material that forms dots capable of reflecting light having a center wavelength of 550 nm. The cholesteric liquid crystal ink solution Gm is a material that forms dots capable of reflecting right-handed circularly polarized light. That is, the cholesteric liquid crystal ink solution Gm is a material for forming right-handed polarizing green dots.

A cholesteric liquid crystal ink solution Gh was prepared in the same manner as in the case of the cholesteric liquid crystal ink solution Gm, except that the chiral agent was changed to a chiral agent B that will be described below and the amount of addition thereof was 10.23 parts by mass.

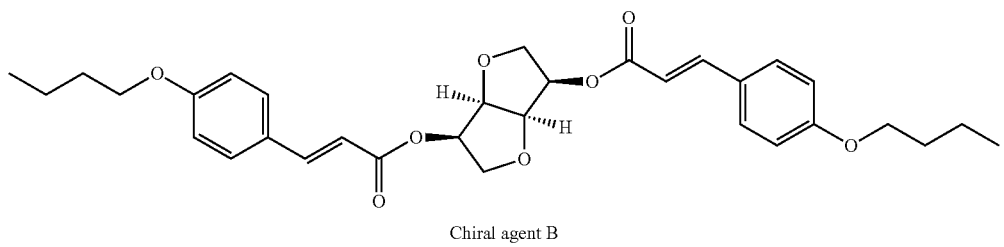 [SMILES: CCCCOc1ccc(/C=C/C(=O)O[C@@H]2CO[C@H]3[C@@H]2OC[C@H]3OC(=O)/C=C/c2ccc(OCCCC)cc2)cc1]

The cholesteric liquid crystal ink solution Gh is a material for forming left-handed polarizing green dots that reflect left-handed circularly polarized light having a center wavelength of 550 nm.

Each of the cholesteric liquid crystal ink solution Gm and the cholesteric liquid crystal ink solution Gh prepared as described above was applied as droplets on the underlayer on the substrate A produced as described above with an inkjet printer (DMP-2831, manufactured by Fujifilm Dimatix, Inc.) over the entire surface of a region having a size of 100 mm×100 mm such that the right-handed polarizing green dot and the left-handed polarizing green dot were arranged alternatingly and a distance (pitch) between centers of the adjacent dots became 100 μm, and the ink solution was dried for 30 seconds at 95° C. Subsequently, the ink solution was irradiated with ultraviolet radiation at a dose of 500 mJ/cm² at room temperature using an ultraviolet irradiation apparatus, and was thereby cured to form dots.

Hereinafter, a configuration in which right-handed polarizing dots and left-handed polarizing dots are formed on one surface of one substrate, as described above, is referred to as a form A.

(Evaluation of Dot Shape and Cholesteric Structure)

Ten dots were randomly selected from among the dots of the transparent screen obtained as described above, and the shape of the dots was observed with a laser microscope (manufactured by Keyence Corporation). The dots had an average diameter of 30 μm and an average maximum height of 5 μm, and the angle formed at a contacting portion of both the dot surface at the dot edge and the underlayer surface (contact angle) was 35 degrees on the average. The height increased continuously in a direction extending from the dot edge toward the center.

Figure 10:
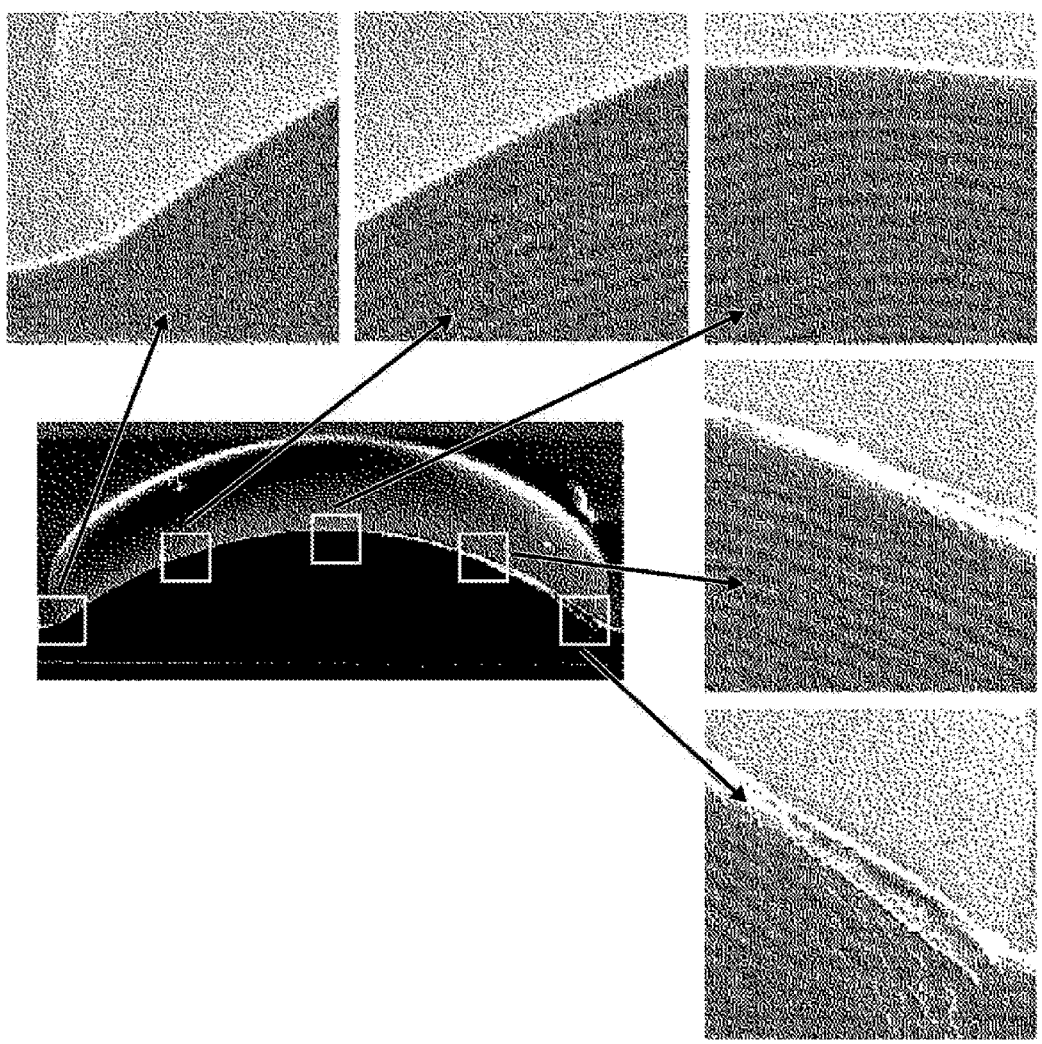
FIG. 10 is a view illustrating an image obtained by observing, by a scanning electron microscope (SEM), a cross-section of the dots of a transparent screen produced in an Example.

One dot positioned at the center of the transparent screen obtained as described above was cut perpendicularly to the PET substrate at a plane including the dot center, and the cross-section was observed with a scanning electron microscope. As a result, a striped pattern of bright parts and dark parts could be recognized inside the dot, and a cross-sectional view as illustrated in FIG. 10 was obtained (the site on the outer side of the hemispherical shape on the right-hand side of the cross-sectional view is a burr created at the time of cutting).

From the cross-sectional view, the angle formed by the direction of the normal line to a line that was formed by a first dark part as counted from the surface on the air interface side of the dot and the surface on the air interface side, was measured, the angles at the dot edge, between the dot edge and the center, and at the dot center were 85 degrees, 85 degrees, and 85 degrees, respectively, and these values were continuously maintained on a curved surface portion of the dot. In Table 1, the angle is written as Angle (degrees) formed by normal line direction of dark line of dot and surface of dot. The angle formed by the direction of the normal line to a line that was formed by a dark line and the direction of the normal line to the PET substrate, decreased continuously from 35 degrees, 18 degrees, to 0 degrees in the order of positions at the dot edge, between the dot edge and the center, and at the dot center, respectively.

(Formation of Overcoat Layer)

A composition as described below was stirred and dissolved in a vessel that had been kept warm at 25° C., and thus a coating liquid for an overcoat layer was prepared.

| Coating liquid for an overcoat layer 1 (parts by mass) | |
|---|---|
| Acetone | 100.0 |
| KAYARAD DPCA-30 (manufactured by Nippon Kayaku Co., Ltd.) | 30.0 |
| EA-200 (manufactured by Osaka Gas Chemicals Co., Ltd.) | 70.0 |
| IRGACURE 819 (manufactured by BASF SE) | 3.0 |

The coating liquid for an overcoat layer 1 prepared as described above was applied on the underlayer on which cholesteric liquid crystal dots had been formed, using a bar coater at a coating amount of 40 mL/m². Subsequently, the substrate was heated so as to obtain a film surface temperature of 50° C., and the coating liquid was dried for 60 seconds. Then, the coating liquid was irradiated with ultraviolet radiation at a dose of 500 mJ/cm² using an ultraviolet irradiation apparatus, and a crosslinking reaction was carried out to produce an overcoat layer. Thus, a transparent screen for 3D display as illustrated in FIG. 1B was obtained.

Example 2

A transparent screen as illustrated in FIG. 5 was produced in the same manner as in Example 1, except that the transparent screen was configured to reflect light in three wavelength regions different from each other, and to have dots that reflected right-handed circularly polarized light and dots that reflected left-handed circularly polarized light as the dots reflecting the light in various wavelength regions. Moreover, an angle formed by the normal line direction of the dark line of the dot and the surface of the dot was measured in the same manner as in Example 1.

Specifically, a transparent screen was produced by forming six kinds of dots using a cholesteric liquid crystal ink solution Gm, a cholesteric liquid crystal ink solution Gh, a cholesteric liquid crystal ink solution Rm, a cholesteric liquid crystal ink solution Bm, and a cholesteric liquid crystal ink solution Rh and a cholesteric liquid crystal ink solution Bh that will be described below, so as to be arranged in sequence.

The cholesteric liquid crystal ink solution Rm was prepared in the same manner as in the case of the cholesteric liquid crystal ink solution Gm, except that the amount of addition of the chiral agent A was changed to 4.66 parts by mass.

The cholesteric liquid crystal ink solution Bm was prepared in the same manner as in the case of the cholesteric liquid crystal ink solution Gm, except that the amount of addition of the chiral agent A was changed to 7.61 parts by mass.

The cholesteric liquid crystal ink solution Rh was prepared in the same manner as in the case of the cholesteric liquid crystal ink solution Gh, except that the amount of addition of the chiral agent B was changed to 8.62 parts by mass.

The cholesteric liquid crystal ink solution Bh was prepared in the same manner as in the case of the cholesteric liquid crystal ink solution Gh, except that the amount of addition of the chiral agent B was changed to 12.59 parts by mass.

The cholesteric liquid crystal ink solutions Rm and Rh are a material for forming left-handed polarizing red dots that reflect left-handed circularly polarized light having a center wavelength of 650 nm, and the cholesteric liquid crystal solutions Bm and Bh are a material for forming left-handed polarizing blue dots that reflect left-handed circularly polarized light having a center wavelength of 450 nm.

Example 3

A transparent screen for 3D display was produced in the same manner as in Example 1, except that the transparent screen was configured to include dots having a region that reflected right-handed circularly polarized light and a region that reflected left-handed circularly polarized light in a single dot, and an angle formed by the normal line direction of the dark line of the dot and the surface of the dot was measured.

Specifically, the transparent screen for 3D display was produced by forming the two-layered dot as illustrated in FIG. 4 using the cholesteric liquid crystal ink solution Gm and the cholesteric liquid crystal ink solution Gh, and an angle formed by the normal line direction of the dark line of the dot and the surface of the dot was measured.

A configuration in which dots having right-handed polarizing regions and left-handed polarizing regions are formed on one surface of one substrate, as described above, is referred to as a form B.

Example 4

A transparent screen for 3D display as illustrated in FIG. 2 was produced in the same manner as in Example 1, except that right-handed polarizing dots were formed on one surface of one substrate and left-handed polarizing dots were formed on the other surface, and an angle formed by the normal line direction of the dark line of the dot and the surface of the dot was measured.

A configuration in which right-handed polarizing dots are formed on one surface of one substrate and left-handed polarizing dots are formed on the other surface, as described above, is referred to as a form C.

Example 5

A transparent screen for 3D display as illustrated in FIG. 3 was produced in the same manner as in Example 1, except that right-handed polarizing dots were formed on the first substrate, left-handed polarizing dots were formed on the second substrate, and the first substrate and the second substrate were adhered to each other, and an angle formed by the normal line direction of the dark line of the dot and the surface of the dot was measured.

The first substrate and the second substrate were produced in the same manner as the substrate A.

As an adhesive layer for adhering the first substrate and the second substrate to each other, SK-DYNE (manufactured by Soken Chemical & Engineering Co., Ltd.) was used. The thickness of the adhesive layer was 20 μm.

A configuration in which a substrate having right-handed polarizing dots formed thereon and a substrate having left-handed polarizing dots formed thereon are adhered to each other, as described above, is referred to as a form D.

Example 6

A transparent screen for 3D display was produced in the same manner as in Example 1, except that the amount of dipentaerythritol hexaacrylate (DPHA) in the underlayer solution was changed to 99.9 parts by mass, and an angle formed by the normal line direction of the dark line of the dot and the surface of the dot was measured.

The angle formed by the direction of the normal line to a line that was formed by a first dark part as counted from the surface on the air interface side of the dot and the surface on the air interface side was 75 degrees.

Examples 7 to 16

Transparent screens for 3D display were produced in the same manner as in Example 1, except that the average diameter of dots and the distance (pitch) between dots were changed to the values shown in Table 1, and angles formed by the normal line direction of the dark line of the dot and the surface of the dot were measured.

Comparative Example 1

A transparent screen for 3D display was produced in the same manner as in Example 1, except that the transparent screen was configured to have only right-handed polarizing dots.

A configuration in which a transparent screen has only dots that reflect one kind of polarized light, as described above, is referred to as a form E.

Comparative Example 2

(Production of Underlayer)

A composition as described below was stirred and dissolved in a vessel that had been kept warm at 25° C., and thus an underlayer solution was prepared.

| Underlayer solution (parts by mass) | |
|---|---|
| Methyl ethyl ketone | 220 |
| Pentaerythritol triacrylate | 100 |
| Leveling agent (BYK361 manufactured by BYK Additives & Instruments) | 0.03 |
| LUCIRIN TPO (manufactured by BASF SE) | 4 |

The underlayer solution prepared as described above was applied on a transparent PET (polyethylene terephthalate, manufactured by Toyobo Co., Ltd., COSMOSHINE A4100) substrate having a thickness of 100 μm using a bar coater at a coating amount of 3 mL/m². Subsequently, the substrate was heated so as to obtain a film surface temperature of 80° C., and the solution was dried for 120 seconds. Thus, an underlayer was produced.

(Formation of Cholesteric Liquid Crystal Dots)

A composition as described below was stirred and dissolved in a vessel that had been kept warm at 25° C., and thus a cholesteric liquid crystal ink solution Gm was prepared.

| Cholesteric liquid crystal ink solution Gm (parts by mass) | |
|---|---|
| Methyl isobutyl ketone | 250.0 |
| Rod-like liquid crystal compound having the following structure | 100.0 |
| LUCIRIN TPO (manufactured by BASF SE) | 4.0 |
| Chiral agent A having the following structure | 5.4 |

Rod-Like Liquid Crystal Compound

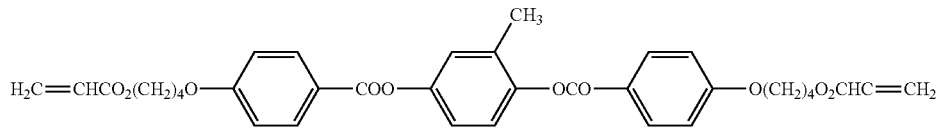

The cholesteric liquid crystal ink solution prepared as described above was applied as droplets on the underlayer on the PET produced as described above by a gravure printing method over the entire surface of a region having a size of 50×50 mm such that the distance between dots was 300 μm and the diameter of dot was 100 μm, and the ink solution was dried by heating, was irradiated with ultraviolet radiation, and was crosslinked. Thus, an optical member was produced.

The cholesteric liquid crystal ink solution Gm is a material for forming dots that reflect light having a center wavelength of 550 nm. In addition, the cholesteric liquid crystal ink solution Gm is a material for forming dots that reflect right-handed circularly polarized light. That is, the cholesteric liquid crystal ink solution Gm is a material for forming right-handed polarizing green dots.

The cholesteric liquid crystal ink solution Gh was prepared in the same manner as in the case of the cholesteric liquid crystal ink solution Gm, except that the chiral agent was changed to a chiral agent B described above and the amount of addition thereof was 8.5 parts by mass.

The cholesteric liquid crystal ink solution Gh is a material for forming left-handed polarizing green dots that reflect left-handed circularly polarized light having a center wavelength of 550 nm.

An overcoat layer was formed in the same manner as in Example 1.

<Evaluation>

For the transparent screens for 3D display of Examples and Comparative Examples thus produced, transparency, visibility of 3D display, viewing angle characteristics, and definition were evaluated.

(Evaluation of Transparency)

Regarding transparency, transmittance was measured using a haze meter (manufactured by Nippon Denshoku Industries Co., Ltd.), and transparency was evaluated.

(Evaluation of Visibility of 3D Display)

Regarding the evaluation of visibility of 3D display, a transparent screen was placed in a conventional office environment, two light sources (EMP 7900 manufactured by Seiko Epson Corporation) were disposed at a position 1 m away from a front surface of the transparent screen, and the transparent screen was irradiated with video light for 3D display by projecting an image for a right eye and an image for a left eye from each light source. The screen was observed from a position 3 m away from a front surface of the screen while changing exposure intensity of the light source, the exposure intensity necessary for viewing the video image projected on the transparent screen in a 3D manner was measured by using an illuminance meter T-10A manufactured by Konica Minolta, Inc. disposed on a center of the screen, and the visibility of 3D display was evaluated according to the following criteria.

A: 1,500 lux or less
B: Greater than 1,500 lux and 3,000 lux or less
C: Greater than 3,000 lux and 8,000 lux or less
D: Greater than 8,000 lux
E: Not viewed in a 3D manner (Evaluation of Viewing Angle Characteristics)

Viewing angle characteristics are evaluated in the same manner as the evaluation of visibility of 3D display by observing from an angle of 45°. The criteria for the evaluation were also the same.

(Evaluation of Definition)

In the evaluation of visibility of 3D display, the exposure intensity of the light source was set to 2,000 lumens, and a display image was observed. The definition of the display image was evaluated according to the following criteria.

A: Favorable
B: Slightly rough
C: Rough

The results are presented in Table 1.

TABLE 1

|  | Form | Selective reflection wavelength | | | DPHA amount in underlayer (parts by mass) | Angle (degrees) formed by normal line direction of dark line of dot and surface of dot | Dot diameter (μm) |
| --- | --- | --- | --- | --- | --- | --- | --- |
|  |  | 450 nm | 550 nm | 650 nm |  |  |  |
| Example 1 | A | — | 550 nm | — | 15 | 85 | 30 |
| Example 2 | A | 450 nm | 550 nm | 650 nm | 15 | 85 | 30 |
| Example 3 | B | — | 550 nm | — | 15 | 80 | 30 |
| Example 4 | C | — | 550 nm | — | 15 | 80 | 30 |
| Example 5 | D | — | 550 nm | — | 15 | 80 | 30 |
| Example 6 | A | — | 550 nm | — | 99.9 | 75 | 30 |
| Example 7 | A | — | 550 nm | — | 15 | 85 | 3 |
| Example 8 | A | — | 550 nm | — | 15 | 85 | 5 |
| Example 9 | A | — | 550 nm | — | 15 | 85 | 30 |
| Example 10 | A | — | 550 nm | — | 15 | 85 | 240 |
| Example 11 | A | — | 550 nm | — | 15 | 85 | 255 |
| Example 12 | A | — | 550 nm | — | 15 | 85 | 30 |
| Example 13 | A | — | 550 nm | — | 15 | 85 | 30 |
| Example 14 | A | — | 550 nm | — | 15 | 85 | 30 |
| Example 15 | A | — | 550 nm | — | 15 | 85 | 30 |
| Example 16 | A | — | 550 nm | — | 15 | 85 | 30 |

TABLE 1-continued

| | | | | | | | |
|---|---|---|---|---|---|---|---|
| Comparative Example 1 | E | — | 550 nm | — | 15 | 85 | 30 |
| Comparative Example 2 | A | — | 550 nm | — | 15 | 65 | 30 |

| | Distance between dots (μm) | Dot diameter/ distance between dots | Haze value (transparency) (%) | Visibility of 3D display | Viewing angle characteristics | Definition |
|---|---|---|---|---|---|---|
| Example 1 | 100 | 30% | 0.7 | A | A | A |
| Example 2 | 100 | 30% | 0.7 | A | A | A |
| Example 3 | 100 | 30% | 0.7 | A | A | A |
| Example 4 | 100 | 30% | 0.7 | A | A | A |
| Example 5 | 100 | 30% | 0.7 | A | A | A |
| Example 6 | 100 | 30% | 0.7 | B | B | A |
| Example 7 | 10 | 30% | 0.7 | B | A | A |
| Example 8 | 17 | 30% | 0.7 | A | A | A |
| Example 9 | 100 | 30% | 0.7 | A | A | A |
| Example 10 | 800 | 30% | 0.7 | A | A | A |
| Example 11 | 850 | 30% | 0.7 | A | A | B |
| Example 12 | 30 | 100% | 5.0 | A | A | A |
| Example 13 | 35 | 86% | 2.0 | A | A | A |
| Example 14 | 100 | 30% | 0.7 | A | A | A |
| Example 15 | 800 | 3.8% | 0.5 | A | A | A |
| Example 16 | 850 | 3.5% | 0.5 | A | A | B |
| Comparative Example 1 | 100 | 30% | 0.7 | E | — | — |
| Comparative Example 2 | 100 | 30% | 0.7 | C | C | A |

As shown in Table 1, it can be seen that Examples 1 to 16, which are transparent screens for 3D display of the invention, can increase all of the transparency and the viewing angle characteristics compared to Comparative Example 1.

From a comparison between Example 1 and Example 6, it can be seen that the angle formed by the dot surface at the dot edge and the substrate is preferably 70° or larger.

From a comparison between Example 1 and Example 2, it can be seen that performances are maintained in a full color as well as a single color, without impairing the haze, the visibility of 3D display, the viewing angle characteristics, and the definition.

From a comparison among Examples 7 to 11, it can be seen that the diameter of the dot is preferably 5 μm to 250 μm.

From a comparison among Examples 12 to 16, it can be seen that the distance (pitch) between the dots adjacent to each other is preferably 800 μm or less.

Example 21

Next, a 3D display of the DFD system without using 3D glasses was attempted as Example 21.

The first substrate and the second substrate in Example 5 were used, and a transparent screen for 3D display was produced in the same manner as in Example 5, except that in a state where the substrates were are parallel to each other, the both substrates were fixed at a distance between the both substrates of 50 mm.

Two light sources (EMP 7900 manufactured by Seiko Epson Corporation) were disposed at a position 1 m away from a front surface of the transparent screen, and the transparent screen was irradiated with video light for 3D display of the DFD system by performing the projection from each light source such that an image of right-handed circularly polarized light was focused on the first substrate and an image of left-handed circularly polarized light was focused on the second substrate.

As a result, the visibility of 3D display, the viewing angle characteristics, and the definition equivalent to those of Example 5 using 3D glasses were achieved with naked eyes.

From the above-described results, the effects of the invention are obvious.

EXPLANATION OF REFERENCES 10a to 10i: transparent screen for 3D display
12, 12a, 12b: substrate
14: support
16: overcoat layer
17: adhesive layer
18: underlayer
20m: right-handed polarizing dot
20h: left-handed polarizing dot
20Rm: right-handed polarizing red dot
20Rh: left-handed polarizing red dot
20Gm: right-handed polarizing green dot
20Gh: left-handed polarizing green dot
20Bm: right-handed polarizing blue dot
20Bh: left-handed polarizing blue dot
20W: two-layered dot
20S: six-layered dot
21m: right-handed polarizing region
21h: left-handed polarizing region
21Rm: right-handed polarizing red region
21Rh: left-handed polarizing red region
21Gm: right-handed polarizing green region
21Gh: left-handed polarizing green region
21Bm: right-handed polarizing blue region
21Bh: left-handed polarizing blue region
100: 3D display system
102: projecting device
104: 3D glasses
106: right-eye polarizing filter
108: left-eye polarizing filter
110: light source
112: circularly polarizing unit 114: right-handed circularly polarizing plate
116: left-handed circularly polarizing plate

What is claimed is:

1. A transparent screen for 3D display comprising:
a plurality of dots, each of the dots having wavelength selectivity and being formed of a liquid crystal material having a cholesteric structure; and
a transparent substrate having the plurality of dots formed on the surface thereof,
wherein the cholesteric structure gives a striped pattern of bright parts and dark parts in a cross-sectional view of the dot observed by a scanning electron microscope,
the dot includes a portion having a height that increases continuously to the maximum height in a direction extending from the edge toward the center of the dot,
in the portion, the angle formed by the normal line to a line that is formed by a first dark part as counted from the surface of the dot and the surface of the dot is in the range of 70° to 90°,
right-handed circularly polarized light and left-handed circularly polarized light are reflected by the plurality of dots,
the plurality of dots include dots that reflect right-handed circularly polarized light and dots that reflect left-handed circularly polarized light, and
the dot that reflects the right-handed circularly polarized light is formed on one surface of the transparent substrate and the dot that reflects the left-handed circularly polarized light is formed on the other surface of the transparent substrate.

2. The transparent screen for 3D display according to claim 1, which includes dots each having, in a single dot, a region that reflects the right-handed circularly polarized light and a region that reflects the left-handed circularly polarized light.

3. The transparent screen for 3D display according to claim 1, wherein the plurality of dots include two or more kinds of dots that reflect light in wavelength regions different from each other.

4. The transparent screen for 3D display according to claim 1, wherein a diameter of the dot is 5 to 250 μm.

5. The transparent screen for 3D display according to claim 1, wherein a distance between dots adjacent to each other is equal to or larger than the diameter of the dot and equal to or smaller than 850 μm.

6. The transparent screen for 3D display according to claim 1, wherein the liquid crystal material is a material obtainable by curing a liquid crystal composition including a liquid crystal compound, a chiral agent, and a surfactant.

7. A 3D display system comprising:
the transparent screen for 3D display according to claim 1;
a projecting device that projects a video image on the transparent screen for 3D display by using the right-handed circularly polarized light and the left-handed circularly polarized light; and
glasses including a right-handed polarizing filter that transmits the right-handed circularly polarized light and does not transmit the left-handed circularly polarized light, and a left-handed polarizing filter that transmits the left-handed circularly polarized light and does not transmit the right-handed circularly polarized light.

8. A transparent screen for 3D display comprising:
a plurality of dots, each of the dots having wavelength selectivity and being formed of a liquid crystal material having a cholesteric structure; and
a transparent substrate having the plurality of dots formed on the surface thereof,
wherein the cholesteric structure gives a striped pattern of bright parts and dark parts in a cross-sectional view of the dot observed by a scanning electron microscope,
the dot includes a portion having a height that increases continuously to the maximum height in a direction extending from the edge toward the center of the dot,
in the portion, the angle formed by the normal line to a line that is formed by a first dark part as counted from the surface of the dot and the surface of the dot is in the range of 70° to 90°,
right-handed circularly polarized light and left-handed circularly polarized light are reflected by the plurality of dots,
the plurality of dots include dots that reflect right-handed circularly polarized light and dots that reflect left-handed circularly polarized light,
a first transparent substrate having the dot that reflects the right-handed circularly polarized light formed thereon and a second transparent substrate having the dot that reflects the left-handed circularly polarized light formed thereon are provided, and
the first transparent substrate having the dot that reflects the right-handed circularly polarized light formed thereon and the second transparent substrate having the dot that reflects the left-handed circularly polarized light formed thereon are laminated.

9. The transparent screen for 3D display according to claim 8, which includes dots each having, in a single dot, a region that reflects the right-handed circularly polarized light and a region that reflects the left-handed circularly polarized light.

* * * * *